US011007725B2

(12) United States Patent
Ochi

(10) Patent No.: US 11,007,725 B2
(45) Date of Patent: May 18, 2021

(54) METHOD FOR MANUFACTURING THREE-DIMENSIONAL OBJECT

(71) Applicant: MIMAKI ENGINEERING CO., LTD., Nagano (JP)

(72) Inventor: Kazuhiro Ochi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 287 days.

(21) Appl. No.: 15/564,169

(22) PCT Filed: Apr. 6, 2016

(86) PCT No.: PCT/JP2016/061253
§ 371 (c)(1),
(2) Date: Oct. 3, 2017

(87) PCT Pub. No.: WO2016/163391
PCT Pub. Date: Oct. 13, 2016

(65) Prior Publication Data
US 2018/0117856 A1    May 3, 2018

(30) Foreign Application Priority Data

Apr. 7, 2015 (JP) .............................. JP2015-078777

(51) Int. Cl.
| | |
|---|---|
| *B29C 67/04* | (2017.01) |
| *B33Y 10/00* | (2015.01) |
| *B33Y 30/00* | (2015.01) |
| *B33Y 50/02* | (2015.01) |
| *B29C 64/112* | (2017.01) |
| *B29C 64/386* | (2017.01) |
| *B41J 2/145* | (2006.01) |
| *G05B 19/4099* | (2006.01) |

(52) U.S. Cl.
CPC ............ *B29C 67/04* (2013.01); *B29C 64/112* (2017.08); *B29C 64/386* (2017.08); *B33Y 10/00* (2014.12); *B33Y 30/00* (2014.12); *B33Y 50/02* (2014.12); *B29K 2995/002* (2013.01); *B29K 2995/0021* (2013.01); *B41J 2/145* (2013.01); *G05B 19/4099* (2013.01)

(58) Field of Classification Search
None
See application file for complete search history.

(56) References Cited

U.S. PATENT DOCUMENTS

| 6,086,193 A | * | 7/2000 | Shimada | ............... B41J 2/17503 |
| | | | | 347/86 |
| 2002/0167101 A1 | * | 11/2002 | Tochimoto | .............. B29C 41/36 |
| | | | | 264/40.1 |

(Continued)

*Primary Examiner* — Peter L Vajda
*Assistant Examiner* — Adrianna N Konves
(74) *Attorney, Agent, or Firm* — Rankin, Hill & Clark LLP

(57) ABSTRACT

A method for manufacturing a three-dimensional object is provided. The method reduces the difference between the amount of build material used and the amount of decorative ink used. The method for manufacturing a three-dimensional object including an object body portion (A) and a decorative portion (C) is provided. The method includes forming the object body portion (A) from at least decorative ink and build material and forming the decorative portion (C) from the decorative ink. The decorative portion (C) covers the object body portion (A).

14 Claims, 8 Drawing Sheets

(56) References Cited

U.S. PATENT DOCUMENTS

| | | | |
|---|---|---|---|
| 2006/0206227 A1* | 9/2006 | Kritchman | B29C 41/48 700/119 |
| 2015/0142159 A1* | 5/2015 | Chang | B29C 64/106 700/119 |
| 2015/0183160 A1* | 7/2015 | Ohnishi | B29C 64/40 264/129 |
| 2015/0324490 A1* | 11/2015 | Page | G05B 19/4183 700/98 |
| 2016/0346996 A1* | 12/2016 | Hakkaku | B33Y 10/00 |

* cited by examiner (a)

(b)

METHOD FOR MANUFACTURING THREE-DIMENSIONAL OBJECT

DETAILED DESCRIPTION OF THE INVENTION

Technical Field

The present invention relates to a method for manufacturing a three-dimensional object, and more particularly to a method and apparatus for manufacturing a three-dimensional object by building layers of deposited ink.

BACKGROUND ART

Examples of known technologies for manufacturing a three-dimensional object include ink-jet printing, sheet lamination, fused deposition molding (FDM), ink-jet binder printing, stereo lithography (SL), and selective laser sintering (SLS).

Among these, a method of the ink-jet technology is widely used. The method involves depositing layers of extruded build material, which can be cured by being subjected to light irradiation. The method can be performed as follows. First, data of the three-dimensional object desired to be finally obtained, namely, data including the external and internal appearance designs, the structure, and other features, is created via a three dimensional computer aided design (CAD) system, and the data is sliced at a predetermined interval to create multi-layered pattern data. Subsequently, build material is extruded according to the pattern data of each layer and the layers are deposited. In this manner, the three-dimensional object is manufactured.

Three-dimensional objects formed using such a technique may have a decorated surface. For example, Patent Document 1 discloses a forming apparatus including, in addition to a means for depositing build material, a means for printing decorative ink onto the surface of the build material for each layer or each plurality of layers in the layered object.

RELATED ART DOCUMENTS

Patent Documents

[Patent document 1] Japanese Unexamined Patent Application Publication No. 2013-43338

DISCLOSURE OF THE INVENTION

Problems to be Solved by the Invention

However, when a surface decorated three-dimensional object is manufactured using a forming apparatus such as disclosed in Patent Document 1, a difference occurs between the amount of build material used and the amount of decorative ink used. That is, the consumption of the decorative ink that forms the decorative portion of the three-dimensional object is extremely low compared with the consumption of the build material that forms the object body portion of the three-dimensional object.

As described above, the frequency of use differs between the build material and the decorative ink, and therefore the time at which ink replacement is needed is not the same between them. As a result, it is likely that, at the time when the more frequently used inks (build material) are replaced, the less frequently used inks (decorative ink), too, will be replaced. This results in disposal of large quantities of decorative ink. Even if the more frequently used inks only are replaced, there is a possibility that the less frequently used inks may exceed their expiration dates in some cases.

In view of the above circumstances, an object of the present invention is to provide a method and an apparatus for manufacturing a three-dimensional object. The method and the apparatus reduce the difference between the amount of build material used and the amount of decorative ink used.

Means of Solving the Problems

According to one aspect of the present invention, a method for manufacturing a three-dimensional object is a method for manufacturing a three-dimensional object including an object body portion and a decorative portion. The method includes forming the object body portion from at least decorative ink and build material, and forming the decorative portion from the decorative ink. The decorative portion covers the object body portion.

In the method described above, the object body portion, which is typically formed from build material, is formed from at least decorative ink and build material. That is, in the embodiment of the present invention, part of the object body portion may be formed from decorative ink, in place of build material, to form the object body portion. In this manner, decorative ink, which tends to be used less frequently, is used in place of build material, which tends to be used more frequently, to form the object body portion. As a result, the difference between the amount of build material used and the amount of decorative ink used is reduced.

In the aspect of the present invention, the method for manufacturing a three-dimensional object may be as follows. The forming of the object body portion may include forming a core portion of the object body portion from at least the decorative ink and forming an outer shell portion from at least the build material, the outer shell portion constituting an outer shell of the core portion and covering the core portion.

In the method described above, the outer shell portion may be provided between the decorative portion and the core portion. This configuration inhibits the color of the decorative ink forming the core portion from affecting the decorative portion, which is adjacent to the outer layers of the three-dimensional object.

In the aspect of the present invention, the method for manufacturing a three-dimensional object may be as follows. In the forming of the core portion, the core portion may be formed from the decorative ink. In the forming of the outer shell portion, the outer shell portion may be formed from the build material.

As in the method described above, the core portion of the object body portion may be formed from the decorative ink and the outer shell portion of the object body portion may be formed from the build material. When the build material is white, the outer shell portion, formed from a white ink, may be provided between the decorative portion and the core portion. This configuration inhibits the color of the decorative ink forming the core portion from appearing in the outer layers of the three-dimensional object and ensures that the color of the decorative portion is adjusted by subtractive mixing.

In the aspect of the present invention, the method for manufacturing a three-dimensional object may be as follows. In the forming of the core portion, the core portion may be formed from a mixed material including the build material and the decorative ink mixed together. In the forming of the outer shell portion, the outer shell portion may be formed from the mixed material. The method may include forming a coating portion from a white ink. The coating portion covers the outer shell portion.

In the method described above, the core portion and the outer shell portion of the object body portion may both be formed from a mixed material including the decorative ink and the build material mixed together. In this case, the coating portion, which is formed from a white ink, may be provided between the decorative portion and the outer shell portion. This configuration inhibits the color of the decorative ink forming the object body portion from appearing in the outer layers of the three-dimensional object and ensures that the color of the decorative portion is adjusted by subtractive mixing.

In the aspect of the present invention, the method for manufacturing a three-dimensional object may further include calculating and comparing. The calculating may calculate, based on three-dimensional data of the three-dimensional object, a total amount of the build material to be used in a case where the object body portion of the three-dimensional object is formed exclusively from the build material and a total amount of the decorative ink to be used in a case where the decorative portion of the three-dimensional object is formed exclusively from the decorative ink. The comparing may compare the total amount of the build material calculated in the calculating with the total amount of the decorative ink calculated in the calculating. When a result of the comparing is that a difference between the total amount of the build material and the total amount of the decorative ink is greater than a predetermined amount, the forming of the object body portion and the forming of the decorative portion may be performed.

In the method described above, in the case where the difference between the total amount of the build material and the total amount of the decorative ink is greater than a predetermined amount, part of the object body portion may be formed from the decorative ink in place of the build material, to form the object body portion. That is, the three-dimensional data of the three-dimensional object to be formed may be analyzed and then a determination may be made of whether to use the decorative ink in place of the build material to form part of the object body portion. This configuration more effectively reduces the difference between the amount of build material used and the amount of decorative ink used.

In the aspect of the present invention, the method for manufacturing a three-dimensional object may be as follows. The forming of the object body portion may include forming a core portion of the object body portion from at least the decorative ink and forming an outer shell portion from at least the build material, the outer shell portion constituting an outer shell of the core portion and covering the core portion. In the forming of the core portion, the core portion may be formed from the decorative ink, and in the forming of the outer shell portion, the outer shell portion may be formed from the build material. The method may further include determining regions including a region defining the core portion and a region defining the outer shell portion. The determining may be performed when a result of the comparing is that the difference between the total amount of the build material and the total amount of the decorative ink is greater than a predetermined amount, and the determining may be according to the difference. In the forming of the core portion, the core portion may be formed from the decorative ink according to the region determined in the determining of the regions, and in the forming of the outer shell portion, the outer shell portion may be formed from the build material according to the region determined in the determining of the regions.

In the method described above, the regions defining the core portion and the outer shell portion may be determined according to the difference between the total amount of the build material and the total amount of the decorative ink. As a result, the difference between the amount of build material used and the amount of decorative ink used is reduced more accurately.

In the aspect of the present invention, the method for manufacturing a three-dimensional object may further include determining a decorative ink to be used to form the core portion and determining an amount of the decorative ink to be used determined in the determining of the decorative ink. The decorative ink may be determined according to the total amount of the decorative ink calculated in the calculating. The amount of the decorative ink may be determined according to the region defining the core portion determined in the determining of the regions. In the forming of the core portion, the core portion may be formed, according to the region determined in the determining of the regions, from the decorative ink determined in the determining of the decorative ink in the amount determined in the determining of the amount of the decorative ink to be used.

In the method described above, the decorative ink to be used to form the core portion may be determined according to the total amount of the decorative ink. As a result, the difference between the amount of decorative ink used and the amount of build material used, on an individual decorative ink basis, is reduced more accurately.

In the aspect of the present invention, the method for manufacturing a three-dimensional object may be as follows. The forming of the object body portion may include forming a core portion of the object body portion from at least the decorative ink and forming an outer shell portion from at least the build material, the outer shell portion constituting an outer shell of the core portion and covering the core portion. In the forming of the core portion, the core portion may be formed from a mixed material including the build material and the decorative ink mixed together, and in the forming of the outer shell portion, the outer shell portion may be formed from the mixed material. The method may further include forming a coating portion from a white ink. The coating portion covers the outer shell portion. The method may further include determining an amount of the decorative ink to be included in the mixed material to be used to form the core portion and the outer shell portion. The determining may be performed when a result of the comparing is that the difference between the total amount of the build material and the total amount of the decorative ink is greater than a predetermined amount, and the determining may be according to the difference. In the forming of the core portion, the core portion may be formed from the mixed material including the decorative ink in the amount determined in the determining of the amount of the decorative ink to be used, and in the forming of the outer shell portion, the outer shell portion may be formed from the mixed material including the decorative ink in the amount determined in the determining of the amount of the decorative ink to be used.

In the method described above, the amount of the decorative ink to be included in the mixed material to be used to form the core portion and the outer shell portion may be determined according to the difference between the total amount of the build material and the total amount of the decorative ink. As a result, the difference between the amount of build material used and the amount of decorative ink used is reduced more accurately.

In the aspect of the present invention, the method for manufacturing a three-dimensional object may be as follows. The method may further include determining, according to the total amount of the decorative ink calculated in the calculating, a decorative ink to be included in the mixed material. In the forming of the core portion, the core portion may be formed from the mixed material including the decorative ink determined in the determining of the decorative ink in the amount determined in the determining of the amount of the decorative ink to be used. In the forming of the outer shell portion, the outer shell portion may be formed from the mixed material including the decorative ink determined in the determining of the decorative ink in the amount determined in the determining of the amount of the decorative ink to be used.

In the method described above, the decorative ink to be included in the mixed material may be determined according to the total amount of the decorative ink. As a result, the difference between the amount of decorative ink used and the amount of build material used, on an individual decorative ink basis, is reduced more accurately.

In the aspect of the present invention, the method for manufacturing a three-dimensional object may be as follows. The method may further include forming a coating portion from a white ink. The coating portion covers the object body portion. In the forming of the decorative portion, the decorative portion may be formed from the decorative ink. The decorative portion covers the coating portion.

In the method described above, the coating portion, which is formed from a white ink, may be provided between the decorative portion and the object body portion. This configuration inhibits, in the case where the build material is transparent, for example, the color of the decorative ink forming the core portion from appearing in the outer layers of the three-dimensional object, and ensures that the color of the decorative portion is adjusted by subtractive mixing.

In the aspect of the present invention, the method for manufacturing a three-dimensional object may be as follows. The forming of the object body portion may include forming a core portion of the object body portion from at least the decorative ink and forming an outer shell portion from at least the build material, the outer shell portion constituting an outer shell of the core portion and covering the core portion. In the forming of the outer shell portion, the outer shell portion may be formed to have a thickness that prevents the color of the decorative ink forming the core portion from appearing through the outer shell portion.

The method described above inhibits degradation of color quality of the decorative portion, which may otherwise occur if the color of the decorative ink forming the core portion appears through the coating portion or the outer shell portion. As a result, the ink(s) selected for the decorative portion achieves a desired color.

In the aspect of the present invention, the method for manufacturing a three-dimensional object may be as follows. The forming of the object body portion may include forming a core portion of the object body portion from at least the decorative ink and forming an outer shell portion from at least the build material, the outer shell portion constituting an outer shell of the core portion and covering the core portion. A volume of the core portion is larger than a volume of the outer shell portion. The volume of the outer shell portion is larger than or equal to the volume of the decorative portion.

In the method described above, the region (volume) of the core portion may be larger than the region (volume) of the outer shell portion, and thus the amount of the ink used to form the core portion may be greater than the amount of the ink used to form the outer shell portion. As a result, the amount of the decorative ink used in place of the build material increases, and thus the decorative ink is consumed more efficiently. Consequently, the difference between the amount of build material used and the amount of decorative ink used is reduced more effectively. Furthermore, when the outer shell portion has a thickness greater than or equal to the thickness of the decorative portion, the thickness sufficiently inhibits the color of the decorative ink forming the core portion from appearing in the outer layers of the three-dimensional object through the outer shell portion.

In the aspect of the present invention, the method for manufacturing a three-dimensional object may be as follows. The build material and the decorative ink may have a same cure shrinkage.

The method described above inhibits warping at the interfaces of the core portion and the outer shell portion after the build material and the decorative ink are cured.

In the aspect of the present invention, the method for manufacturing a three-dimensional object may be as follows. The build material and the decorative ink may be extruded using ink-jet technology to manufacture the three-dimensional object.

The method according to the embodiment of the present invention for manufacturing the three-dimensional object 5 produces more effectively the effect of reducing the difference between the amount of build material used and the amount of decorative ink used when the three-dimensional object 5 is manufactured using ink-jet technology.

A manufacturing apparatus according to another aspect of the present invention is a manufacturing apparatus for manufacturing a three-dimensional object including an object body portion and a decorative portion. The manufacturing apparatus may include a printer, a calculator, and a comparator. The printer may be configured to form the three-dimensional object from build material and decorative ink. The calculator may be configured to calculate, based on three-dimensional data of the three-dimensional object, a total amount of the build material to be used in a case where the object body portion of the three-dimensional object is formed exclusively from the build material and a total amount of the decorative ink to be used in a case where the decorative portion of the three-dimensional object is formed exclusively from the decorative ink. The comparator may be configured to compare the total amount of the build material calculated by the calculator with the total amount of the decorative ink calculated by the calculator. When a result of comparison by the comparator is that a difference between the total amount of the build material and the total amount of the decorative ink is greater than a predetermined amount, the printer may be configured to form the object body portion from at least the decorative ink and the build material and may be configured to form the decorative portion from the decorative ink. The decorative portion covers the object body portion.

With the configuration described above, the object body portion can be formed from decorative ink, which tends to be used less frequently, in place of build material, which tends to be used more frequently. This configuration results in efficient consumption of the decorative ink and therefore reduces the difference between the amount of build material used and the amount of decorative ink used.

Effects of the Invention

Embodiments of the present invention reduce the difference between the amount of build material used and the amount of decorative ink used.

MODE FOR CARRYING OUT THE INVENTION

First Embodiment

A method according to an embodiment of the present invention for manufacturing a three-dimensional object will be described. First, provided below are overviews of a three-dimensional object to be manufactured in this embodiment and a manufacturing apparatus for manufacturing the three-dimensional object.

(1) Overview of Three-Dimensional Object

Figure 1:
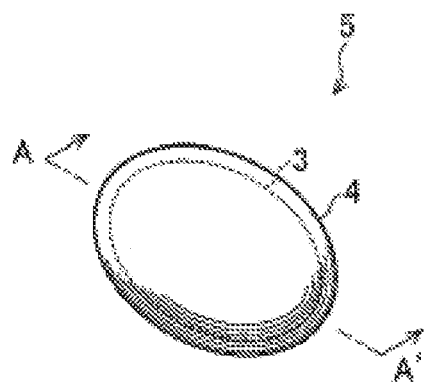
FIG. 1(a) is a perspective view of a three-dimensional object to be manufactured.
FIG. 1(b) is a partial sectional view of the three-dimensional object taken along the line A-A' of FIG. 1(a) and viewed in the direction of the arrow.
Figure 1:
Figure 1:
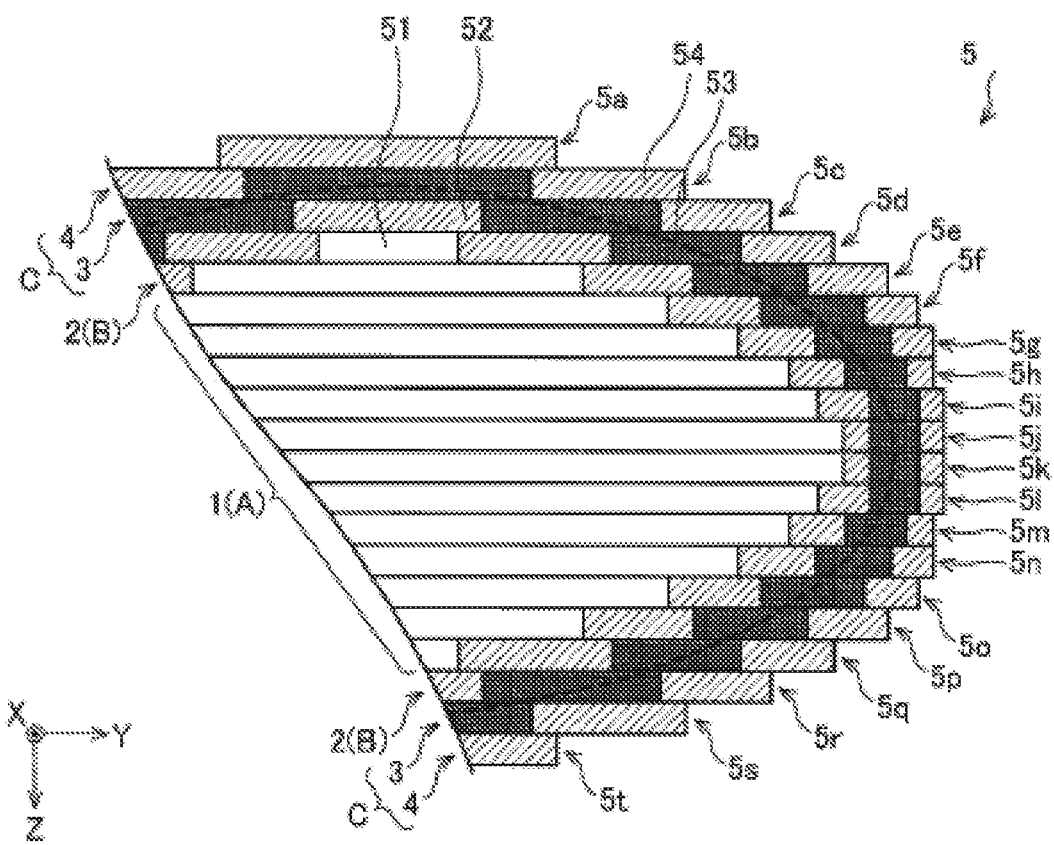

FIG. 1 illustrates a three-dimensional object to be manufactured in this embodiment. FIG. 1(a) is an external view of a three-dimensional object, and FIG. 1(b) is a partial sectional view of the three-dimensional object taken along the line A-A' of FIG. 1(a) and viewed in the direction of the arrow.

A three-dimensional object 5 illustrated in FIG. 1(a) has an approximately ellipsoidal shape whose horizontal cross-section is elliptical. The shape of the three-dimensional object 5 is not limited to the shape illustrated in FIG. 1, and may be of any of a variety of shapes such as, for example, hexahedral, spherical, hollow, ring-shaped, and horseshoe shaped.

As illustrated in FIG. 1(b), the three-dimensional object 5 includes an object body portion A, a coating portion B, and a decorative portion C. The object body portion A includes build layers 1, the coating portion B includes light-reflecting layers 2, and the decorative portion C includes colored layers 3 and transparent layers 4. As illustrated in FIG. 1(b), in the three-dimensional object 5, from the outer layers (from the outer periphery) toward the inside (toward a middle portion), the transparent layers 4, the colored layers 3, the light-reflecting layers 2, and the build layers 1 are arranged in this order.

As described above, in this embodiment, the build layers 1 are regarded as the object body portion A, the light-reflecting layers 2, which coat the surface of the object body portion A, are regarded as the coating portion B, and the colored layers 3, which cover the surface of the coating portion B, and the transparent layers 4 are regarded as the decorative portion C. However, the present invention is not necessarily limited to this. For example, the three-dimensional object 5 may be configured without the coating portion B. and the colored layers 3 alone may be regarded as the decorative portion C.

The build layers 1, the light-reflecting layers 2, the colored layers 3, and the transparent layers 4 are all formed, using a manufacturing apparatus of this embodiment, by extruding ink by ink-jet technology and depositing the ink. The manufacturing apparatus will be described later.

Examples of the ink include ultraviolet curable ink. Use of ultraviolet curable ink is advantageous in that the ink can be cured in a short time and thus the ink can be deposited easily, and consequently the three-dimensional object 5 can be manufactured in a shorter time. The ultraviolet curable ink contains an ultraviolet curable compound. Examples of the ultraviolet curable compound include curable monomers and curable oligomers that can be polymerized by ultraviolet light irradiation. Examples of the curable monomers include low viscosity acrylic monomers, vinyl ethers, oxetane monomers and alicyclic epoxy monomers. Examples of the curable oligomers include acrylic oligomers.

In the present invention, the ink is not limited to ultraviolet curable ink and may be, for example, thermoplastic ink. In the case of thermoplastic ink, the extruded high temperature ink cures when it is cooled at room temperature. In order to complete the curing in a shorter time, a technique for forcibly cooling the ink may be employed.

As illustrated in FIG. 1(b), the three-dimensional object 5 is a structure three-dimensionally formed by additive manufacturing. The structure includes a plurality of layers 5a, 5b, 5c, 5d, 5e . . . deposited using ink-jet technology. In the coordinate system in the drawings, the axis along the layer deposition direction is the Z axis. In the coordinate system, the layers 5a. 5b, 5c, 5d, 5e . . . extend along the X-Y axis plane. The total number of the layers to be deposited is not particularly limited.

As described above, in the three-dimensional object 5, the build layers 1 are coated with the light-reflecting layers 2, the colored layers 3, and the transparent layers 4 in this order, from the build layers 1, located in the middle portion, toward the outer layers. The layers 5a, 5b, 5c, 5d, 5e . . . in FIG. 1(b) are layers that would be obtained if the three-dimensional object 5 were sliced into a plurality of layers in the Z axis direction. The layers 5a. 5b, 5c, 5d, 5e . . . each include, depending on the deposition location, at least one of the following: a build layer 1 portion (hereinafter referred to as "build layer portion 51"), a light-reflecting layer 2 portion (hereinafter referred to as "light-reflecting layer portion 52"), a colored layer 3 portion (hereinafter referred to as "colored layer portion 53"), and a transparent layer 4 portion (hereinafter referred to as "transparent layer portion 54").

Specifically, as illustrated in FIG. 1(b), among the plurality of layers 5a . . . , the layer 5t, at the lowermost position, and the layer 5a, at the uppermost position, are layers made up of only a transparent layer portion 54. The layers 5b and 5s are located respectively on facing sides (inner sides) of the layers 5a and St. In each of the layers 5b and 5s, a transparent layer portion 54 is disposed on the outer periphery of a colored layer portion 53. The layers 5c and 5r are located inside the layers 5b and 5s, respectively. The layers 5c and 5r each include a transparent layer portion 54, a colored layer portion 53, and a light-reflecting layer portion 52 arranged in this order from the outer peripheral edge toward the middle. The layers 5d and 5q are located inside the layers 5c and 5r, respectively. The layers 5d and 5q each include a transparent layer portion 54, a colored layer portion 53, a light-reflecting layer portion 52, and a build layer portion 51 arranged in this order from the outer peripheral edge toward the middle. The layers, from the lowermost layer 5t to the final uppermost layer 5a, are formed in the Z axis direction upwardly by additive manufacturing using ink-jet technology. In this manner, the multilayer structure illustrated in FIG. 1(b) is achieved. The numbers of the various layers are not limited to the numbers illustrated in FIG. 1(b). The configuration of each of the layers Sa . . . is not limited to the configuration described above provided that the three-dimensional object 5, illustrated in FIG. 1(a), is three-dimensionally formed by additive manufacturing.

As illustrated in FIG. 1(b), the plurality of layers 5a, 5b, 5c, 5d, 5e . . . are deposited in the Z axis direction, and as a result, the transparent layer portions 54 in the layers 5a, 5b, 5c, 5d, 5e . . . are connected with one another approximately along the outermost surface of the three-dimensional object 5, to form the transparent layers 4. The layers 5b, 5c . . . 5s each include a colored layer portion 53, and the colored layer portions 53 are connected with one another approximately along the outermost surface of the three-dimensional object 5, to form the colored layers 3. The layers 5c, 5d . . . 5r each include a light-reflective layer portion 52, and the light-reflecting layer portions 52 are deposited to form the light-reflecting layers 2. The layers 5d, 5e . . . 5q each include a build layer portion 51, and the build layer portions 51 are deposited to form the build layers 1.

Figure 2:
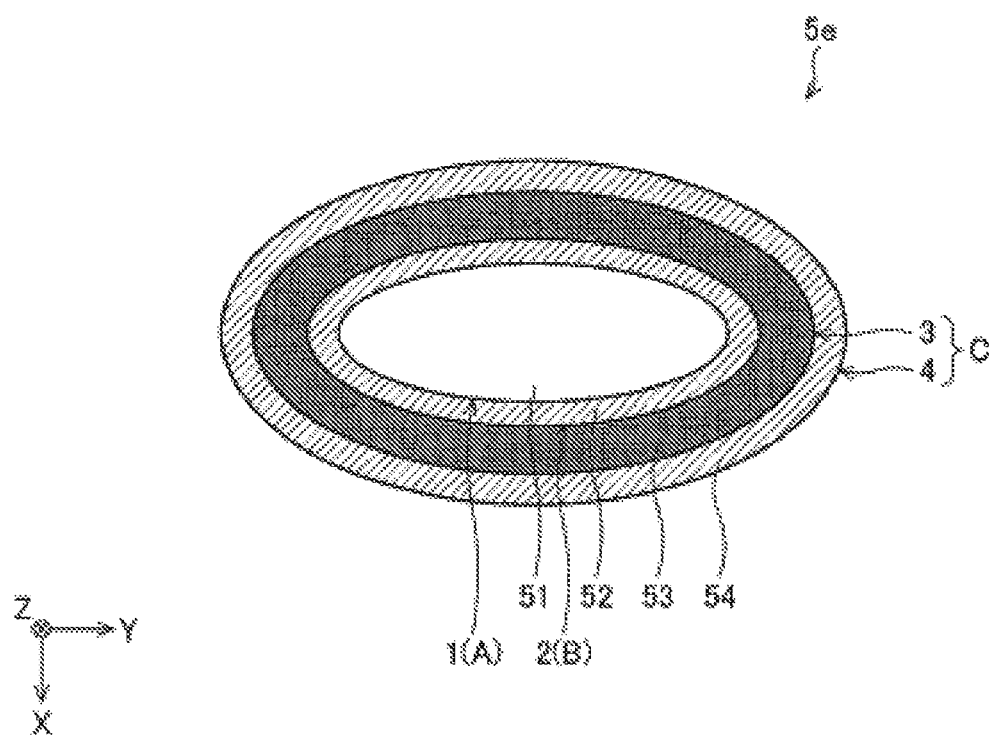
FIG. 2 is a top view of a layer, the fifth from the top, of the three-dimensional object illustrated in FIG. 1(b).

FIG. 2 is a top view of the layer 5e, the fifth layer from the top as illustrated in FIG. 1(b). As illustrated in FIG. 2, the layer 5e includes, from a middle thereof toward the outer peripheral edge, a build layer portion 51, a light-reflecting layer portion 52, a colored layer portion 53, and a transparent layer portion 54 arranged in this order. The build layer portion 51 is a constituent of the object body portion A, the light-reflecting layer portion 52 is a constituent of the coating portion B, the colored layer portion 53 and the transparent layer portion 54 are constituents of the decorative portion C.

(2) Layers of Three-Dimensional Object

In the following, the layers of the three-dimensional object 5 to be manufactured in this embodiment will be described.

The build layers 1 are layers constituting a central structure of the object body portion and are formed from build material. The light-reflective layers 2 are layers formed from light-reflective ink and are light-reflective. In the light-reflecting layers 2, at least the surfaces adjacent to the colored layers 3 can reflect light in the visible spectrum. Specifically, the light-reflective layer 2 may be formed from an ink containing a metal powder or an ink containing a white pigment. Preferably, the light-reflecting layer 2 may be formed from a white ink. The light-reflecting layer 2, when formed from a white ink, can suitably reflect light coming from the outer layers of the three-dimensional object 5. As a result, coloring by subtractive mixing can be accomplished.

The colored layers 3 are formed from ink containing a colorant. Examples of the coloring ink containing a colorant (hereinafter also referred to as coloring ink) include inks of yellow (Y), magenta (M), cyan (C), black (K), and light color inks of these colors. However, this is not limiting, and the examples may include inks of red (R), green (G), blue (B), and orange (Or), for example. Furthermore, the examples may include metallic inks, pearl inks, and phosphor inks. In order to produce a desired color, one or more of the coloring inks mentioned above are used.

Lastly, the transparent layers 4 are formed from a transparent ink. The transparent ink may be ink that can form a transparent layer having a light transmittance per unit thickness of greater than or equal to 50%. The unit thickness refers to the minimum thickness of the transparent layer. If the light transmittance per unit thickness of the transparent layers is less than 50%, transmission of light is blocked disadvantageously. This hinders the three-dimensional object 5 from exhibiting a desired color by way of subtractive mixing and thus is not desirable. It is preferable to use ink that can form transparent layers having a light transmittance per unit thickness of greater than or equal to 80%. It is more preferable to use ink that can form transparent layers having a light transmittance per unit thickness of greater than or equal to 90%.

The transparent layers 4 not only serve as protection layers for the colored layers 3 but also produce the advantageous effect of enabling precise manufacturing of the three-dimensional object 5 in this embodiment, which employs additive manufacturing. Specifically, if the colored layers 3 were to constitute the outermost layers of the three-dimensional object 5, the colored layers 3 would have to be deposited to a thickness smaller than the thicknesses of the other layers (build layers 1 and light-reflecting layers 2) to achieve coloring to a desired depth of color only with the coloring ink that forms the colored layers 3. Thus, there is a possibility that the colored layers 3 cannot be formed accurately. However, in the present embodiment, the transparent layers 4 are formed as the outermost layers of the three-dimensional object 5. Because of this, the colored layers 3 can be deposited to a thickness similar to the thicknesses of the other layers, and a desired color can be presented via the transparent layers 4.

The three-dimensional object 5 may be formed without the transparent layers 4. However, in the case where the colored layers 3 constitute the outermost layers of the three-dimensional object 5, the colored layers 3 are exposed to the outside and thus are prone to color fading due to abrasion or discoloration due to ultraviolet light. On the other hand, in the present embodiment, the three-dimensional object 5 includes the transparent layers 4, which are the outermost layers, and therefore the colored layers 3 are prevented from color fading or discoloration. In this regard as well, inclusion of the transparent layers 4 is preferred.

(3) Manufacturing Apparatus

Figure 3:
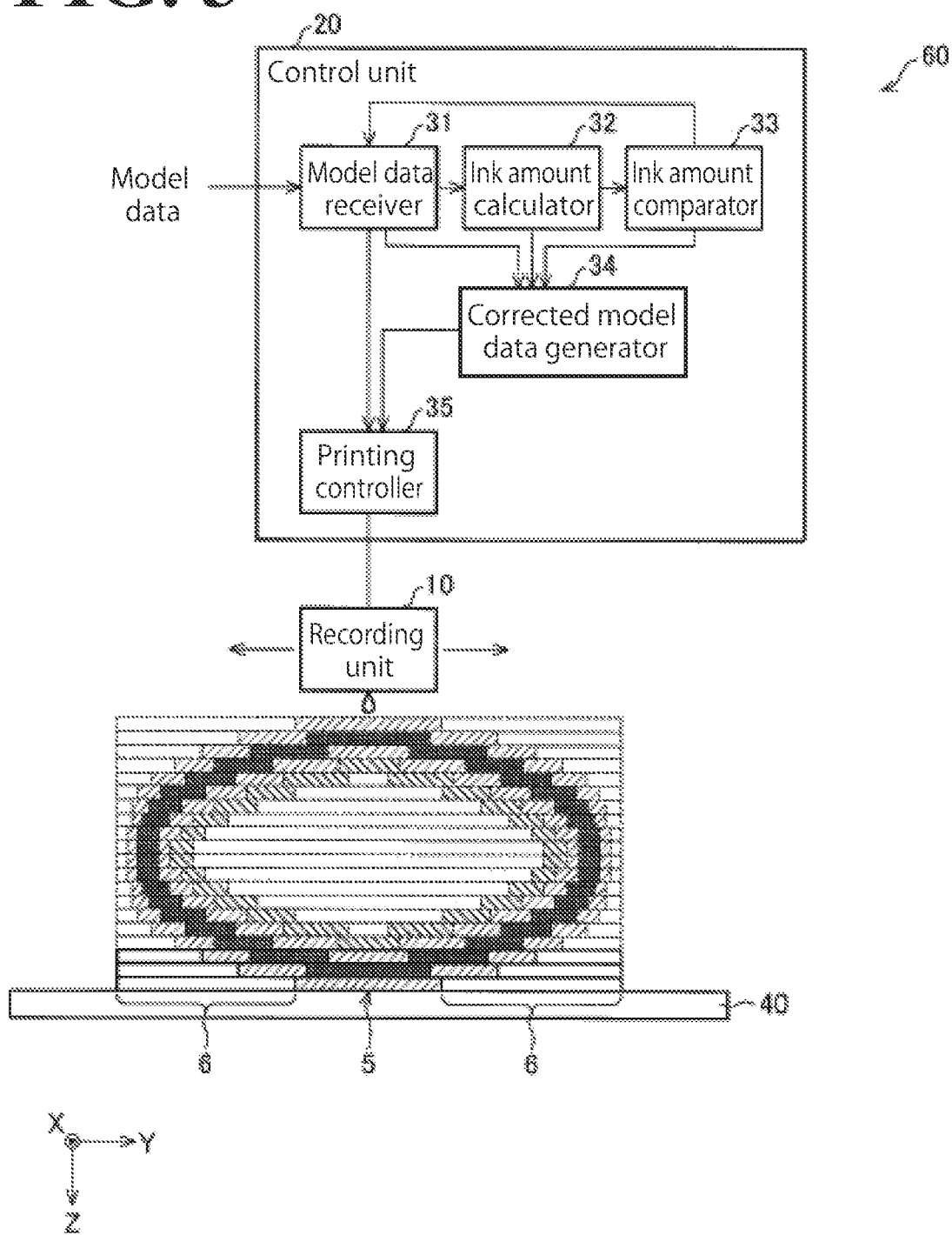
FIG. 3 illustrates main components of an apparatus according to an embodiment of the present invention for manufacturing a three-dimensional object.

FIG. 3 illustrates main components of a manufacturing apparatus 60 according to this embodiment for manufacturing a three-dimensional object 5 (hereinafter referred to as manufacturing apparatus 60). FIG. 3 also illustrates a three-dimensional object 5 in the process of manufacturing.

The manufacturing apparatus 60 of this embodiment is an apparatus for manufacturing a three-dimensional object 5 by additive manufacturing. The three-dimensional object 5 is a multilayer structure as illustrated in FIG. 1(b) and includes the object body portion A, the coating portion B, which covers the surface of the object body portion A, and the decorative portion C, which decorates the surface of the coating portion B. As illustrated in FIG. 3, the manufacturing apparatus 60 of this embodiment includes a recording unit 10 (printing unit), a control unit 20, and a platform 40.

A support 6, illustrated in FIG. 3, is not a constituent of the three-dimensional object 5, and serves to support or hold the build material and other materials in the process of forming the three-dimensional object 5. Since the support 6 is not a constituent of the three-dimensional object 5, the support 6 is removed at an appropriate time.

(3-1) Recording Unit

Figure 4:
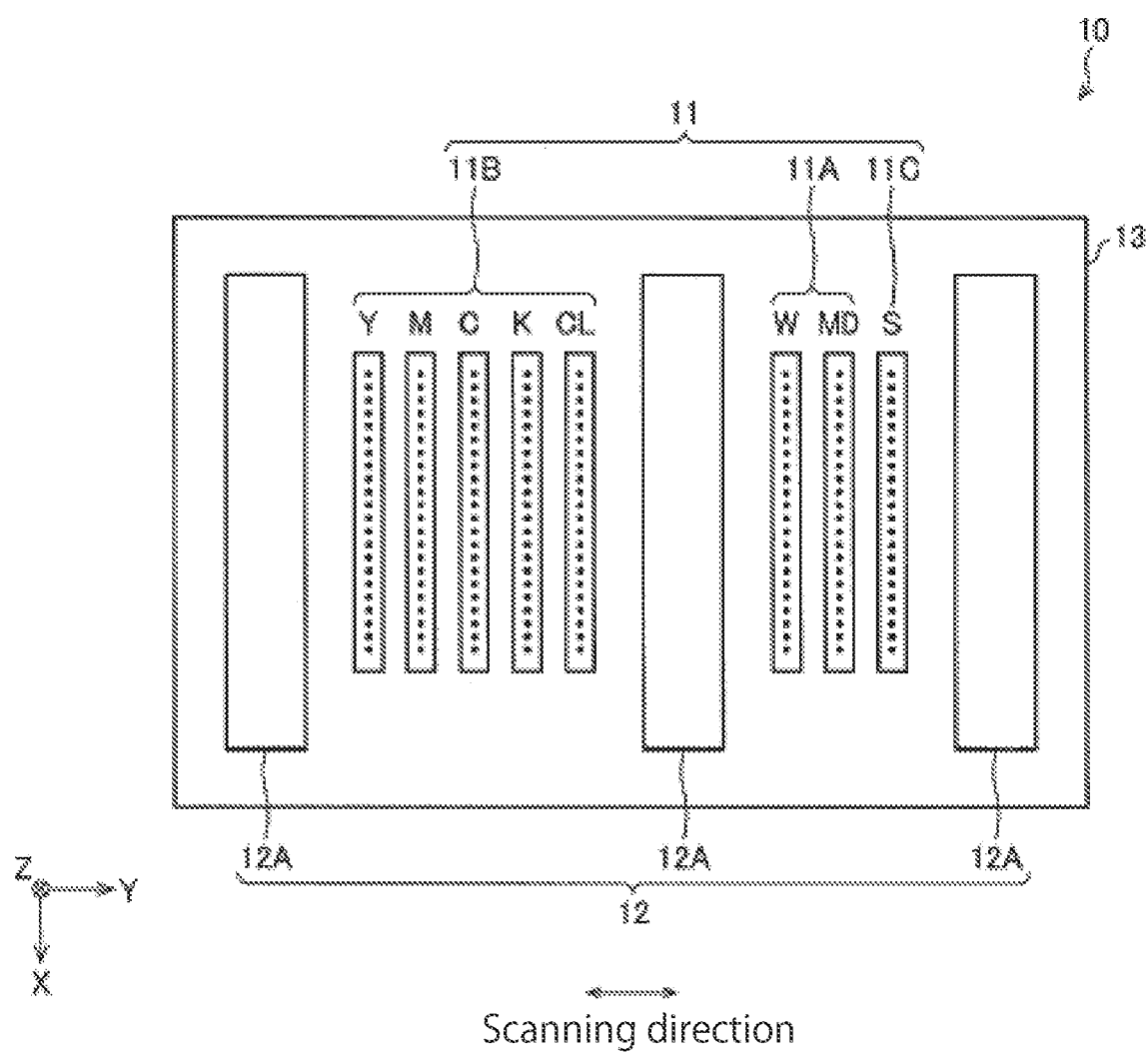
FIG. 4 illustrates a specific configuration of a recording unit according to an embodiment of the present invention, with an ink extrusion surface (bottom surface) of the recording unit being illustrated.

The recording unit 10 is a unit that extrudes the above-described inks using ink-jet technology and causes the extruded inks to cure. FIG. 4 illustrates a specific configuration of the recording unit 10, with an ink extrusion surface (bottom surface) of the recording unit 10 being illustrated. As illustrated in FIG. 4, the recording unit 10 includes a carriage 13, an ink-jet head 11, and an ultraviolet (UV) irradiation unit 12.

(3-1-1) Carriage 13

The carriage 13 is reciprocally movable along the Y axis and is provided with the ink-jet head 11 and the UV irradiation unit 12. The movement of the carriage 13 is controlled by the control unit 20, which will be described later.

(3-1-2) Ink-Jet Head 11

The ink-jet head 11 extrudes the above-described inks using ink-jet technology. Specifically, as illustrated in FIG. 4, the ink-jet head 11 includes a first ink-jet head nozzle unit 11A, a second ink-jet head nozzle unit 11B, and a third ink-jet head nozzle unit 11C.

The first ink-jet head nozzle unit 11A extrudes inks that form the object body portion A (the build layers 1, illustrated in FIG. 1(b)) and the coating portion B (the light-reflecting layers 2, illustrated in FIG. 1(b)). The object body portion A and the coating portion B are constituents of the three-dimensional object 5, illustrated in FIG. 1 (b). In this embodiment, as the inks, a build material ink that forms the build layers 1 and a white ink that forms the light-reflecting layers 2 are used. Thus, the first ink-jet head nozzle unit 11A includes a build material nozzle array MD, which extrudes a build material, and a white ink nozzle array W, which extrudes a white ink. Examples of the build material include known build materials, and further include a white ink and a transparent ink. The white ink is extruded from the white ink nozzle array W and the transparent ink is extruded from a transparent ink nozzle array CL, which will be described later.

The second ink-jet head nozzle unit 11B extrudes inks that form the decorative portion C (the colored layers 3 and the transparent layers 4, illustrated in FIG. 1(b)). The decorative portion C is a constituent of the three-dimensional object 5, illustrated in FIG. 1 (b). In this embodiment, as the decorative inks, coloring inks that form the colored layers 3 (yellow ink, magenta ink, cyan ink, and black ink) and a transparent ink that forms the transparent layers 4 are used. Thus, the second ink-jet head nozzle unit 11B includes a yellow ink nozzle array Y, which extrudes a yellow ink, a magenta ink nozzle array M, which extrudes a magenta ink, a cyan ink nozzle array C, which extrudes a cyan ink, a black ink nozzle array K, which extrudes a black ink, and a transparent ink nozzle array CL, which extrudes a transparent ink.

The third ink-jet head nozzle unit 11C extrudes a support material that forms the support 6, which is not a constituent of the three-dimensional object 5. Thus, the third ink-jet head nozzle unit 11C includes a support material nozzle array S, which extrudes a support material. Examples of the support material include known materials such as water soluble ultraviolet curable resins.

The plurality of nozzle arrays included in the first ink-jet head nozzle unit 11A, the plurality of nozzle arrays included in the second ink-jet head nozzle unit 11B, and the nozzle array included in the third ink-jet head nozzle unit 11C are arranged along the scanning direction (Y axis direction) of the recording unit 10. That is, as illustrated in FIG. 4, the yellow ink nozzle array Y, the magenta ink nozzle array M, the cyan ink nozzle array C, the black ink nozzle array K, the transparent ink nozzle array CL, the white ink nozzle array W, the build material nozzle array MD, and the support material nozzle array S are arranged in this order along the Y axis direction.

In each of the nozzle arrays, a plurality of nozzle openings are arranged along the X axis direction as illustrated in FIG. 4. Inks may be extruded through one or some of the nozzle openings of the plurality of nozzle openings. The arrangement and the number of the nozzle arrays are not limited to the arrangement and the number illustrated in FIG. 4.

The recording unit 10 includes the plurality of nozzle arrays mounted to the carriage 13. Thus, while moving in the Y direction with the movement of the carriage 13, the recording unit 10 can extrude (drop) the inks from the plurality of nozzle arrays in the Z axis direction.

(3-1-3) UV Irradiation Unit 12

The UV irradiation unit 12 includes a plurality of irradiators 12A, each of which includes a light source for curing the inks. The irradiators 12A are mounted to the carriage 13. Specifically, the UV irradiation unit 12 includes three irradiators 12A, which are arranged along the Y axis direction. The carriage 13 is provided with the irradiator 12A, the third ink-jet head nozzle unit 11C, the first ink-jet head nozzle unit 11A, the irradiator 12A, the second ink-jet head nozzle unit 11B, and the irradiator 12A, arranged in this order along the Y axis direction, from the right to the left in FIG. 4. Thus, all the nozzle arrays are arranged along the Y direction. As a result, all the inks that form one layer can be extruded in a single movement in the Y direction. Furthermore, since ultraviolet light irradiation is performed together with the extrusion, extrusion and curing can be performed together.

The UV irradiation unit 12 may include a single irradiator 12A, which is sufficient to cure all the inks. However, when the extrusion is to be performed bi-directionally in the Y axis direction, it is desirable that the irradiator 12A be provided at each end of the ink-jet head 11.

(3-2) Control Unit 20

The control unit 20 is a unit that controls the various components. For example, the control unit 20 controls extrusion of inks by the ink-jet head 11, UV irradiation by the UV irradiation unit 12, and the movement (scanning) of the carriage 13.

When the three-dimensional object 5 is manufactured as illustrated in FIGS. 1 to 3, it is likely that the total amount of build material used to manufacture the three-dimensional object 5 is greater than the total amount of decorative ink used to manufacture the three-dimensional object 5. Consequently, it is likely that, at the time when the more frequently used inks (build material) are replaced, the less frequently used inks (decorative ink), too, will be replaced, resulting in disposal of large quantities of decorative ink. Even if the more frequently used inks only are replaced, there is a possibility that the less frequently used inks may exceed their expiration dates in some cases.

In view of the above, in this embodiment, extrusion of inks by the ink-jet head 11 is controlled as follows. In order to reduce the difference between the amount of build material used and the amount of decorative ink used, the model data of the three-dimensional object 5 is corrected according to the amount of the ink to be used to manufacture the three-dimensional object 5. This processing is performed by a model data receiver 31, an ink amount calculator 32 (calculator), an ink amount comparator 33 (comparator), a corrected model data generator 34, and a printing controller 35, which are included in the control unit 20.

The model data receiver 31 acquires model data (including input data for forming the decorative portion) of the three-dimensional object 5 and other data. The model data of the three-dimensional object 5 is multi-layered pattern data created in the following manner. Data of the three-dimensional object 5, desired to be finally obtained, namely, data of the external and internal appearance designs, the structure, and other features, is created via a CAD system, and the data is sliced at a predetermined interval. Each layer of the pattern data represents an ink extrusion pattern. When the three-dimensional object 5 includes an overhang portion, the pattern data includes a support material extrusion pattern. The shape data of the three-dimensional object 5 may be acquired from a source external to the model data receiver 31. The data may be previously stored in the model data receiver 31. The data may be created by the model data receiver 31 based on information acquired from a source external to the model data receiver 31.

The ink amount calculator 32 calculates, based on the model data acquired by the model data receiver 31, the amount of ink to be used to manufacture the three-dimensional object 5, which is manufactured using the model data. Specifically, based on the model data, the ink amount calculator 32 calculates the total amount of the build material to be used in the case where the object body portion A of the three-dimensional object 5 is formed exclusively from the build material, and calculates the total amount of the decorative ink to be used in the case where the decorative portion B of the three-dimensional object 5 is formed exclusively from the decorative ink.

The ink amount comparator 33 compares the total amount of the build material calculated by the ink amount calculator 32 with the total amount of the decorative ink calculated by the ink amount calculator 32. The information on the result of comparison by the ink amount comparator 33 is transmitted to the corrected model data generator 34 or the model data receiver 31. Specifically, when the result of comparison by the ink amount comparator 33 is that the total amount of the build material is greater than the total amount of the decorative ink, the information on the comparison result is transmitted to the corrected model data generator 34. On the other hand, when the result of comparison by the ink amount comparator 33 is that the total amount of the build material is less than or equal to the total amount of the decorative ink, the information on the comparison result is transmitted to the model data receiver 31.

Upon receiving, from the ink amount comparator 33, the information on the comparison result that the total amount of the build material is greater than the total amount of the decorative ink, the corrected model data generator 34 generates corrected model data, which is a corrected version of the model data. Based on the model data acquired by the model data receiver 31, the corrected model data generator 34 generates corrected model data for forming the object body portion A from at least the decorative ink and the build material. This will be described in detail later. Specifically, the corrected model data generator 34 generates corrected model data for forming the object body portion A from at least the decorative ink and forming an outer shell portion from at least the build material. The outer shell portion covers the object body portion and constitutes the outer shell of the object body portion A. Then, the corrected model data generator 34 transmits the generated corrected model data to the printing controller 35.

On the other hand, upon receiving, from the ink amount comparator 33, the information on the comparison result that the total amount of the build material is less than or equal to the total amount of the decorative ink, the model data receiver 31 transmits the acquired model data as it is to the printing controller 35.

Based on the model data received from the model data receiver 31 or the corrected model data received from the corrected model data generator 34, the printing controller 35 controls the extrusion of ink by the ink-jet head 11 (specifically, extrusion of ink, amount of extrusion, and extrusion force, for example) to form the layers. The printing controller 35 performs control of the movement (scanning) of the carriage 13 in parallel with control of the extrusion of ink by the ink-jet head 11. In addition, the printing controller 35 controls the UV irradiation by the UV irradiation unit 12, to irradiate the layers formed by the ink-jet head 11 with ink curing light to cure the layers.

(3-4) Platform 40

The platform 40 is a plate-shaped stage on which the ink extruded from the ink-jet head 11 of the recording unit 10 is to be deposited. The three-dimensional object 5 is manufactured on the platform 40 as illustrated in FIG. 3.

The recording unit 10 is positioned so that its bottom surface faces the top surface of the platform 40. As described above, by reciprocally moving the recording unit 10 along the Y axis direction and causing the recording unit 10 to extrude ink during the movement, a plurality of layers (20 layers in total in this embodiment) can be deposited with the layer 5t being the lowermost layer. The layer 5t is spread along the top surface of the platform 40.

In this embodiment, the platform 40 is stationary and only the recording unit 10 is movable. However, the present invention is not limited to this configuration, and it is sufficient that the relative position between the recording unit 10 and the platform 40 be shiftable in a predetermined direction. Thus, the recording unit 10 may be movable in a predetermined direction in the XYZ coordinate system, or the platform 40 may be movable in a predetermined direction in the XYZ coordinate system.

(4) Method for Manufacturing Three-Dimensional Object

Figure 5:
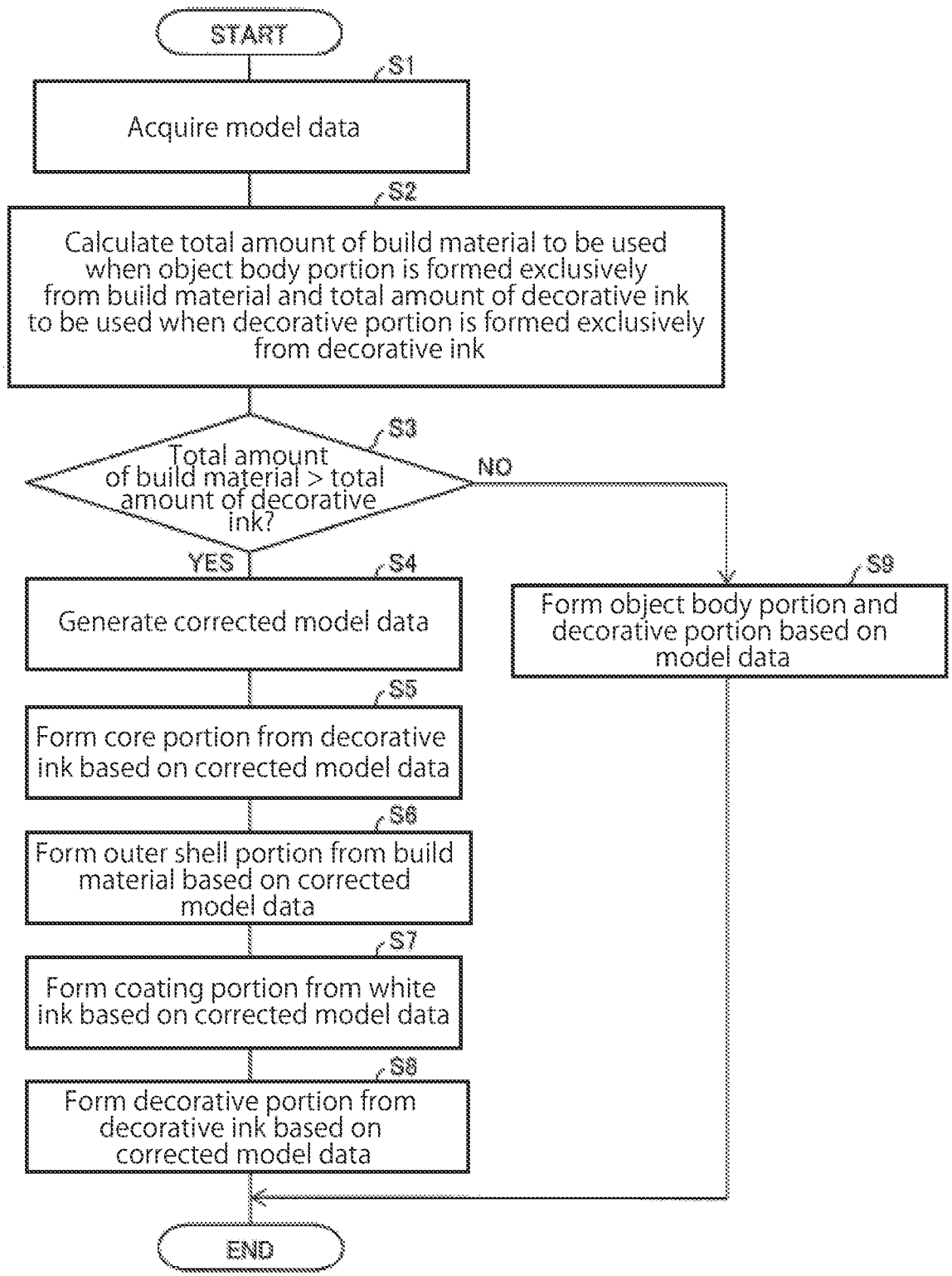
FIG. 5 is a flowchart of a method according to an embodiment of the present invention for manufacturing a three-dimensional object.
Figure 6:
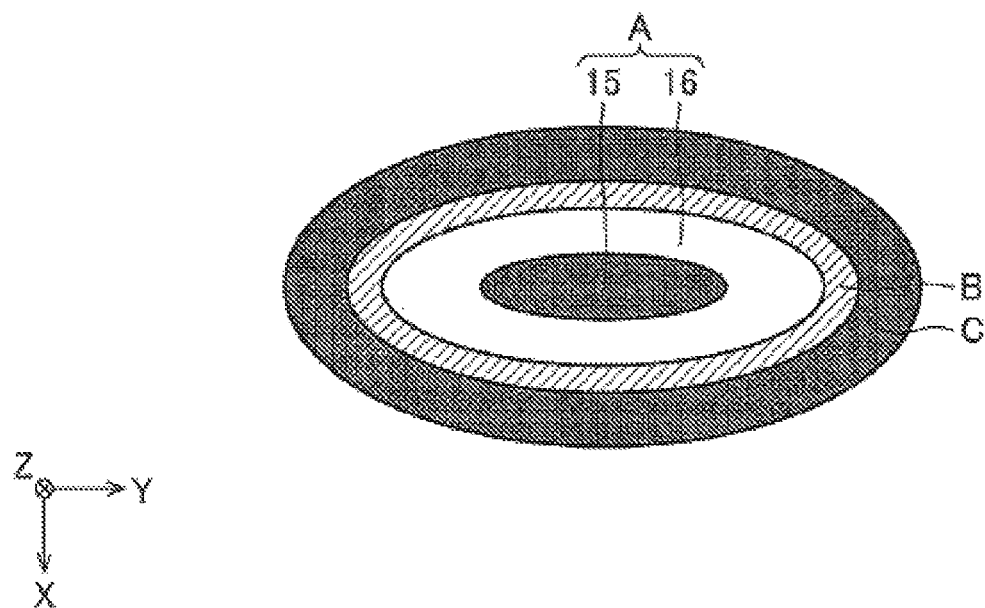
FIG. 6 illustrates a cross-section of a three-dimensional object that is actually manufactured in accordance with the flowchart in FIG. 5.

A method for manufacturing the three-dimensional object 5 according to this embodiment will be described with reference to FIGS. 5 and 6. FIG. 5 is a flowchart illustrating a method for manufacturing the three-dimensional object 5. FIG. 6 illustrates a cross-section of the three-dimensional object 5 that is actually manufactured in accordance with the flowchart in FIG. 5.

First, the model data receiver 31 of the control unit 20 acquires model data (Step S1, hereinafter abbreviated as "S1"), and transmits the model data to the ink amount calculator 32. The ink amount calculator 32 calculates the total amount of the build material to be used in the case where the object body portion A is formed exclusively from the build material, and calculates the total amount of the decorative ink to be used in the case where the decorative portion is formed exclusively from the decorative ink (S2).

Based on the result of calculation by the ink amount calculator 32, the ink amount comparator 33 compares the total amount of the build material calculated by the ink amount calculator 32 with the total amount of the decorative ink calculated by the ink amount calculator 32. When the result of the comparison is that the total amount of the build material is greater than the total amount of the decorative ink (S3, Yes), the ink amount comparator 33 transmits, to the corrected model data generator 34, the information on the comparison result that the total amount of the build material is greater than the total amount of the decorative ink.

Upon receiving, from the ink amount comparator 33, the information on the comparison result that the total amount of the build material is greater than the total amount of the decorative ink, the corrected model data generator 34 generates corrected model data, which is a corrected version of the model data (S4). Based on the model data acquired by the model data receiver 31, the corrected model data generator 34 generates corrected model data for forming the object body portion A from at least the decorative ink and the build material. Specifically, the corrected model data generator 34 generates corrected model data for forming the object body portion A from at least the decorative ink and forming the outer shell portion from at least the build material. The outer shell portion covers the object body portion and constitutes the outer shell of the object body portion A.

The following describes, by way of example, a case in which corrected model data for manufacturing a three-dimensional object 5 having a cross-section illustrated in FIG. 6 are generated. In this case, as illustrated in FIG. 6, the corrected model data generator 34 generates corrected model data for forming a core portion 15 of the object body portion A from the decorative ink and forming an outer shell portion 16, which covers the core portion 15 and constitutes the outer shell of the object body portion A, from at least the build material. Then, the corrected model data generator 34 transmits the generated corrected model data to the printing controller 35.

Based on the corrected model data, the printing controller 35 controls the recording unit 10 so as to form the core portion 15 from the decorative ink (S5). Subsequently, based on the corrected model data, the printing controller 35 controls the recording unit 10 so as to form the outer shell portion 16 from the build material in such a manner that the outer shell portion 16 covers the core portion 15 (S6). In this manner, the object body portion A of the three-dimensional object 5 is formed. Subsequently, based on the corrected model data, the printing controller 35 controls the recording unit 10 so as to form the coating portion B from a white ink in such a manner that the coating portion B covers the outer shell portion 16 (S7). Then, based on the corrected model data, the printing controller 35 controls the recording unit 10 so as to form the decorative portion C from the decorative ink in such a manner that the decorative portion C covers the coating portion B (S8).

In the case where, based on the result of calculation by the ink amount calculator 32, the ink amount comparator 33 compares the total amount of the build material with the total amount of the decorative ink, and the comparison result is that the total amount of the build material is less than or equal to the total amount of the decorative ink (S3, No), the ink amount comparator 33 transmits, to the model data receiver 31, the information on the comparison result that the total amount of the build material is less than or equal to the total amount of the decorative ink. Upon receiving, from the ink amount comparator 33, the information on the comparison result that the total amount of the build material is less than or equal to the total amount of the decorative ink, the model data receiver 31 transmits the acquired model data as it is to the printing controller 35. Based on the model data, the printing controller 35 forms the object body portion A, the coating portion B, and the decorative portion C (S9).

As described above, in this embodiment, the object body portion A, which is typically formed from build material, is divided into the core portion 15 and the outer shell portion 16, and the core portion 16 is formed from at least the decorative ink and the outer shell portion 16 is formed from at least the build material. That is, in this embodiment, part of the object body portion A is formed from the decorative ink, in place of the build material, to form the object body portion A. As a result, the amount of the build material used to form the object body portion A according to this embodiment is reduced and a greater amount of decorative ink is used, compared with the case in which the object body portion A is formed from the build material.

As described above, in this embodiment, the object body portion A can be formed from decorative ink, which tends to be used less frequently, in place of build material, which tends to be used more frequently. This configuration results in efficient consumption of the decorative ink and therefore reduces the difference between the amount of build material used and the amount of decorative ink used. The reduced difference between the amount of build material used and the amount of decorative ink used results in reducing disposal of large quantities of decorative ink, which may otherwise occur because decorative ink, which tends to be used less frequently, will likely be replaced at the time when build material, which tends to be used more frequently, is replaced. Moreover, because of the frequent use of decorative ink, which tends to be used less frequently, the decorative ink is prevented from exceeding its expiration date.

Furthermore, decorative ink, which tends to be used less frequently, is not extruded on a consistent basis and this leads to a higher viscosity of the ink. As a result, there is a higher probability that clogging of the nozzles for extruding the decorative ink will occur. In this embodiment, the decorative ink, which tends to be used less frequently, is used to form the object body portion A and thus the decorative ink is extruded on a consistent basis. This results in inhibiting an increase in viscosity of the decorative ink and thus inhibiting clogging of the nozzles for extruding the decorative ink.

Furthermore, in this embodiment, in the case where the result of comparison by the ink amount comparator 33 is that the total amount of the build material is greater than the total amount of the decorative ink, the corrected model data generator 34 generates corrected model data. That is, in the case where the total amount of the build material is greater than the total amount of the decorative ink, part of the object body portion A is formed from the decorative ink in place of the build material, to form the object body portion A. As described, in this embodiment, the three-dimensional data of the three-dimensional object to be manufactured is analyzed and then a determination is made of whether to use the decorative ink in place of the build material to form part of the object body portion A. This configuration reduces more effectively the difference between the amount of build material used and the amount of decorative ink used.

In this embodiment, in the case where the result of comparison by the ink amount comparator 33 is that the total amount of the build material is greater than the total amount of the decorative ink even by a small amount, the corrected model data generator 34 invariably generates corrected model data. However, the conditions for generating corrected model data is not limited to this. For example, the corrected model data generator 34 may be configured to generate corrected model data only in the case where the result of comparison by the ink amount comparator 33 is that the difference between the total amount of the build material and the total amount of the decorative ink is greater than a predetermined amount. That is, the corrected model data generator 34 may generate corrected model data only in the case where the result of comparison by the ink amount comparator 33 is that the total amount of the build material is greater than the total amount of the decorative ink by a predetermined amount.

It is preferred that the build material and the decorative ink have the same cure shrinkage. This inhibits warping at the interfaces of the core portion and the outer shell portion after the build material and the decorative ink are cured.

In order to ensure the rigidity of the three-dimensional object 5, it is preferred that the decorative ink that forms the object body portion A have approximately the same hardness (strength) after curing as that of the build material. In particular, when reducing the difference in the amount of use by approximately equalizing the amount of the build material to be used and the amount of the decorative ink to be used, there is a possibility that the rigidity of the three-dimensional object 5 may be extremely reduced when the decorative ink that forms the object body portion A has a hardness after curing extremely lower than that of the build material. This is because the amount of the decorative ink to be used to form the object body portion A accounts for approximately half of the amount of the ink to be used to form the three-dimensional object 5. For this reason, it is preferred that the hardness after curing of the decorative ink be approximately the same as that of the build material.

(5) Modification

Figure 7:
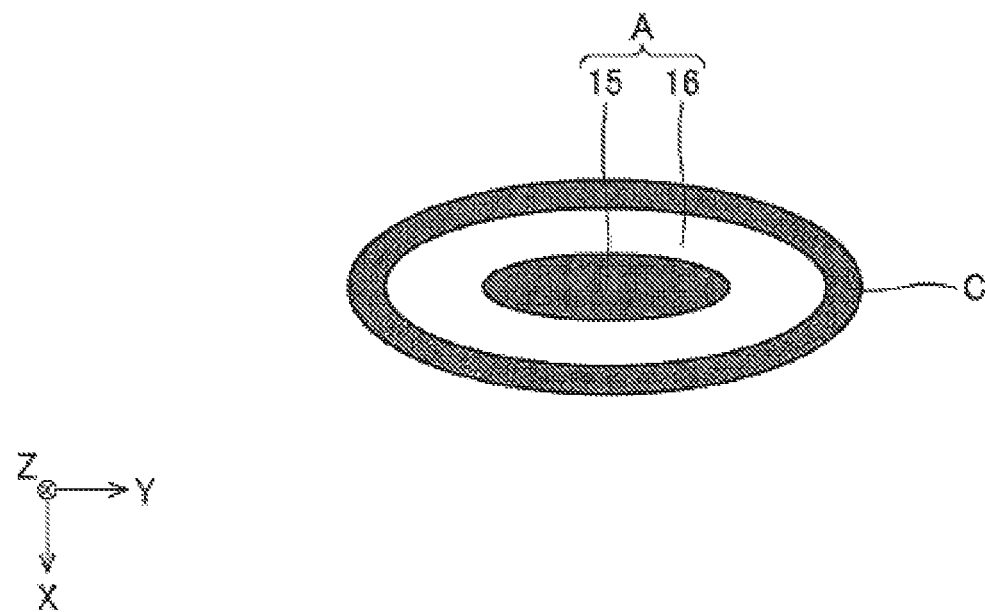
FIG. 7 illustrates a cross-section of a three-dimensional object that is actually manufactured in accordance with a method according to a modification of the present invention for manufacturing a three-dimensional object.

When the build material used to form the object body portion A is transparent, a white ink may be used to form the coating portion B. This configuration inhibits the color of the decorative ink forming the core portion 15 from appearing in the outer layers of the three-dimensional object 5 through the outer shell portion 16 and ensures that the color of the decorative portion is adjusted by subtractive mixing. However, the present invention is not necessarily limited to this. For example, when the build material is white, the corrected model data generator 34 may generate corrected model data for manufacturing a three-dimensional object 5 having a cross-section illustrated in FIG. 7. In this case, the corrected model data generator 34 generates corrected model data in which the coating portion B is not included as illustrated in FIG. 7. When the build material is white, the outer shall portion 16 of the object body portion A serves as the coating portion B and therefore the coating portion B may be omitted. In the manufacturing method, the coating portion B may be omitted by omitting S7 in FIG. 5.

As described above, the coating portion B or the outer shell portion 16 serves to inhibit the color of the decorative ink forming the core portion 15 from appearing in the outer layers of the three-dimensional object 5 through the outer shell portion 16. Thus, both the coating portion B and the outer shell portion 16 are preferably formed to have a thickness that prevents the color of the decorative ink forming the core portion 15 from appearing through the coating portion B or the outer shell portion 16. This configuration inhibits degradation of color quality of the decorative portion C, which may otherwise occur if the color of the decorative ink forming the core portion 15 appears through the coating portion B or the outer shell portion 16. As a result, the ink(s) selected for the decorative portion C achieves a desired color.

(6) Method for Generating Corrected Model Data

For generation of the corrected model data, there are no particular limitations on the proportions of the regions defining the core portion 15 and the outer shell portion 16 in the object body portion A, the decorative ink that forms the core portion 15, the amount of the decorative ink to be used, and other features. In the following, an example of a method for determining the features will be described. However, the present invention is not limited to the example.

(6-1) Determination of Regions

For example, when receiving, from the ink amount comparator 33, information on the comparison result that the total amount of the build material is greater than the total amount of the decorative ink, the corrected model data generator 34 may determine, according to the difference, the regions defining the core portion 15 and the outer shell portion 16. Thus, the regions defining the core portion 15 and the outer shell portion 16 are determined according to the difference between the total amount of the build material and the total amount of the decorative ink. As a result, the difference between the amount of build material used and the amount of decorative ink used is reduced more accurately.

The corrected model data generator 34 determines the regions defining the core portion 15 and the outer shell portion 16 according to the difference between the total amount of the build material and the total amount of the decorative ink, which are compared by the ink amount comparator 33, and generates corrected model data including a core portion 15 and an outer shell portion 16, each defined by the determined region. Based on the corrected model data, the printing controller 35 controls the recording unit 10 so as to form the core portion 15 according to the region defining the core portion 15 from the decorative ink, and to form the outer shell portion 16 according to the region defining the outer shell portion 16 from the build material. The regions defining the core portion 15 and the outer shell portion 16 are determined by the corrected model data generator 34.

Preferably, the corrected model data generator 34 generates corrected model data in which the region (volume) of the core portion 15 is larger than the region (volume) of the outer shell portion 16. When the region (volume) of the core portion 15 is larger than the region (volume) of the outer shell portion 16, the amount of the ink to be used to form the core portion 15 is greater than the amount of the ink to be used to form the outer shell portion 16. As a result, the amount of the decorative ink to be used in place of the build material increases, and thus the decorative ink is consumed more efficiently. Consequently, the difference between the amount of build material used and the amount of decorative ink used is reduced more effectively.

Furthermore, preferably, the corrected model data generator 34 generates corrected model data in which the region (volume) of the outer shell portion 16 is larger than or equal to the region (volume) of the decorative portion C. When the outer shell portion 16 has a thickness greater than or equal to the thickness of the decorative portion, the thickness sufficiently inhibits the color of the decorative ink forming the core portion 15 from appearing in the outer layers of the three-dimensional object 5 through the outer shell portion 16. However, in order to more reliably inhibit the color of the decorative ink forming the core portion 15 from appearing through the outer shell portion 16, it is desirable that the outer shell portion 16 have a thickness that prevents the color of the ink forming the core portion 15 from appearing through the coating portion B or the outer shell portion 16.

(6-2 Determination of Decorative Ink and Amount of Use)

The corrected model data generator 34 may determine the decorative ink(s) that forms the core portion 15 depending on the total amount of the decorative ink calculated by the ink amount calculator 32. For example, based on the total amount of the decorative ink, which is calculated by the ink amount calculator 32, the corrected model data generator 34 may select the decorative ink that is used in the least amount as the decorative ink that forms the core portion 15 or may select a plurality of decorative inks that are used in smaller amounts. Thus, the decorative ink to be used to form the core portion 15 can be determined according to the total amount of the decorative ink, which is calculated by the ink amount calculator 32. As a result, the difference between the amount of decorative ink used and the amount of build material used, on an individual decorative ink basis, is reduced more accurately.

The corrected model data generator 34 may determine the amount of the decorative ink(s) to be used based on the region defining the core portion 15, which is determined according to the difference between the total amount of the build material and the total amount of the decorative ink, which are compared by the ink amount comparator 33. The decorative ink is the determined decorative ink to form the core portion 15. For example, the corrected model data generator 34 may determine the amount of the decorative ink to be used, which is the determined decorative ink to form the core portion 15, as being equivalent to the amount of ink to be used to form the core portion 15, which is formed according to the determined region defining the core portion 15.

In the case where a plurality of decorative inks are selected as the decorative ink that forms the core portion 15, the amount of the ink to be used to form the core portion 15 according to the determined region defining the core portion 15 may be distributed to the selected decorative inks. The amount of the ink to be used to form the core portion 15 may be distributed uniformly among the selected decorative inks or may be distributed according to the remaining quantities of the selected decorative inks.

The corrected model data generator 34 generates corrected model data including a core portion 15 formed from the decorative ink determined to be the decorative ink that forms the core portion 15 in the amount determined to be the amount of the decorative ink to be used. Based on the corrected model data, the printing controller 35 controls the recording unit 10 so as to form the core portion 15, according to the region defining the core portion 15, from the decorative ink determined to be the decorative ink that forms the core portion 15 in the amount determined to be the amount of the decorative ink to be used. The region defining the core portion 15 is determined by the corrected model data generator 34.

(6-3 Other Examples)

In the example described above, the regions defining the core portion 15 and the outer shell portion 16 are determined according to the difference between the total amounts of the build material and the decorative ink to be used to manufacture the three-dimensional object 5. However, the present invention is not limited to this.

For example, the regions defining the core portion 15 and the outer shell portion 16 may be determined based on a typical ratio or a past average ratio between the total amounts of build material and decorative ink that are used to form a three-dimensional object. The typical ratio between the total amount of the build material and the total amount of the decorative ink refers to a typical ratio between the total amounts of build material and decorative ink that are typically used to manufacture a typical three-dimensional object. The typical ratio can be previously stored in the corrected model data generator 34.

The past average ratio between the total amounts of build material and decorative ink refers to the average of ratios between the total amounts of build material and decorative ink that were used to manufacture three-dimensional objects during a predetermined period of time (e.g., in the past one month). Ratios between the total amounts of build material and decorative ink that were used to manufacture three-dimensional objects during a predetermined period of time may be stored in the corrected model data generator 34, and when generating corrected model data, the corrected model data generator 34 may determine the average of the stored ratios of the predetermined period of time.

Based on a typical ratio or a past average ratio between the total amounts of build material and decorative ink that are used to form a three-dimensional object, the corrected model data generator 34 determines the regions defining the core portion 15 and the outer shell portion 16 and generates corrected model data including a core portion 15 and an outer shell portion 16, each defined by the determined region. Based on the corrected model data, the printing controller 35 controls the recording unit 10 so as to form the core portion 15 according to the region defining the core portion 15 from the decorative ink, and to form the outer shell portion 16 according to the region defining the outer shell portion 16 from the build material. The regions defining the core portion 15 and the outer shell portion 16 are determined by the corrected model data generator 34.

Second Embodiment

Figure 8:
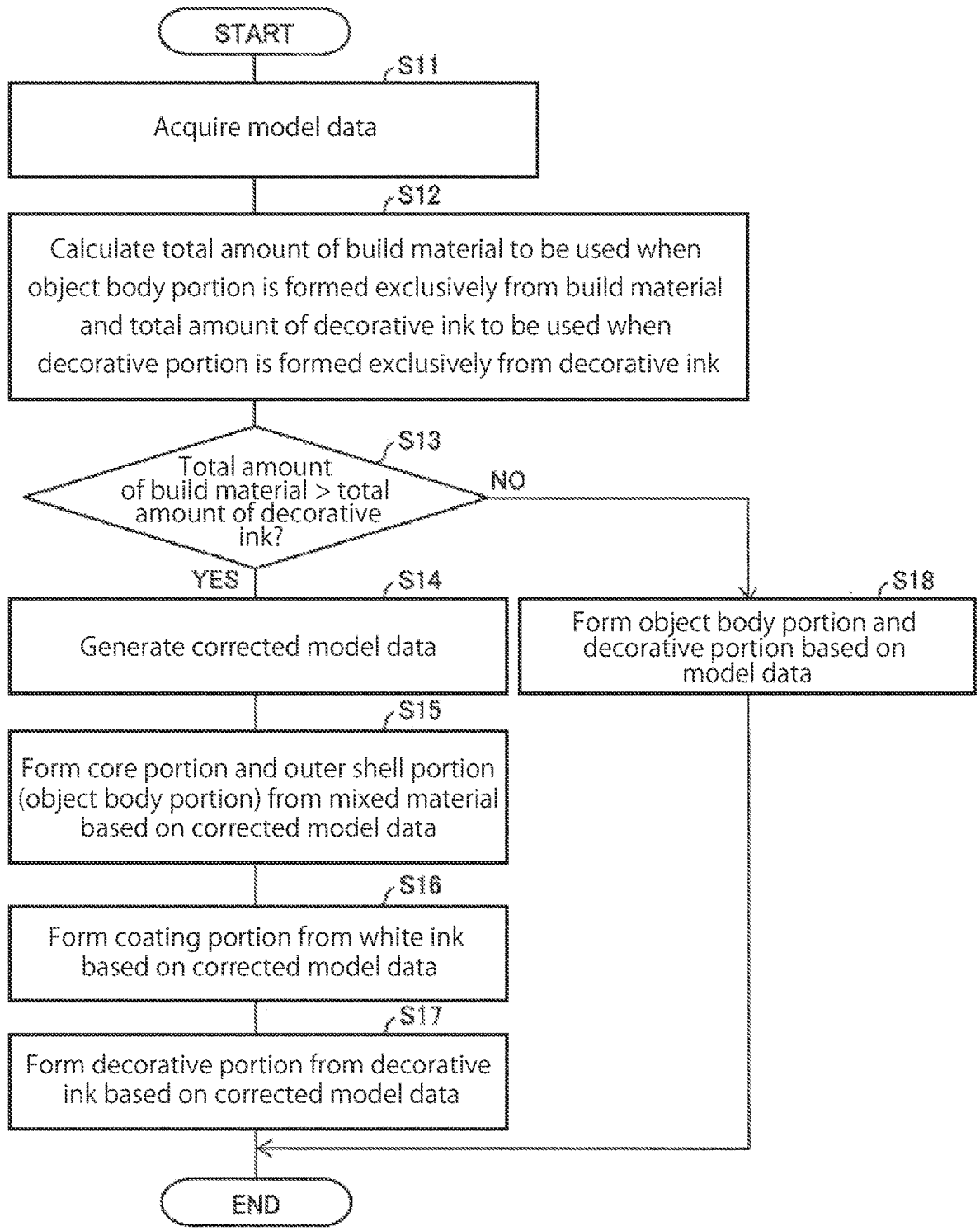
FIG. 8 is a flowchart of a method according to another embodiment of the present invention for manufacturing a three-dimensional object.
Figure 9:
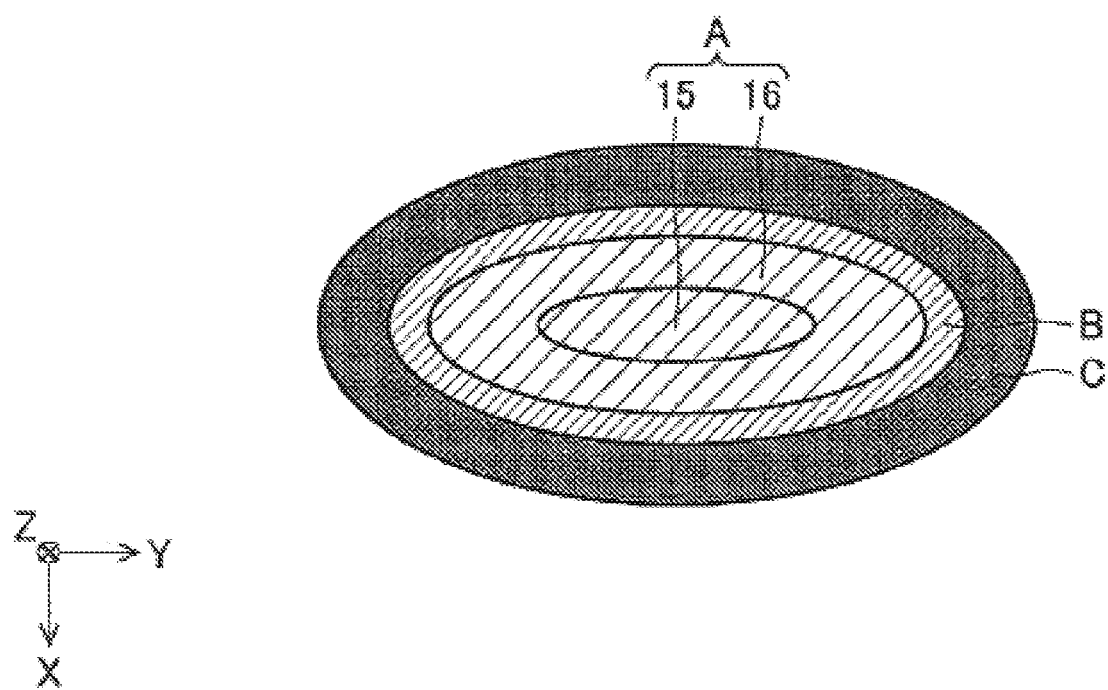
FIG. 9 illustrates a cross-section of a three-dimensional object that is actually manufactured in accordance with the flowchart in FIG. 8.

In the embodiment described above, by way of example, the core portion 15 is formed from the decorative ink and the outer shell portion 16 is formed from the build material. However, the present invention is not necessarily limited to this. In the following, an embodiment different from the above-described embodiment will be described with reference to FIGS. 8 and 9. FIG. 8 is a flowchart illustrating a method for manufacturing a three-dimensional object 5. FIG. 9 illustrates a cross-section of the three-dimensional object 5 that is actually manufactured in accordance with the flowchart in FIG. 8.

(1) Method for Manufacturing Three-Dimensional Object

In a method according to this embodiment for manufacturing a three-dimensional object 5, corrected model data for manufacturing a three-dimensional object 5 having a cross-section illustrated in FIG. 9 are generated. In the three-dimensional object 5 illustrated in FIG. 9, both the core portion 15 and the outer shell portion 16 of the object body portion A are formed from a mixed material including the build material and the decorative ink mixed together. That is, in the three-dimensional object 5 illustrated in FIG. 9, the object body portion A is formed from a mixed material including the build material and the decorative ink mixed together.

First, the model data receiver 31 of the control unit 20 acquires model data (S11), and transmits the model data to the ink amount calculator 32. The ink amount calculator 32 calculates the total amount of the build material to be used in the case where the object body portion A is formed exclusively from the build material, and calculates the total amount of the decorative ink to be used in the case where the decorative portion C is formed exclusively from the decorative ink (S12).

Based on the result of calculation by the ink amount calculator 32, the ink amount comparator 33 compares the total amount of the build material calculated by the ink amount calculator 32 with the total amount of the decorative ink calculated by the ink amount calculator 32. When the comparison result is that the total amount of the build material is greater than the total amount of the decorative ink (S13, Yes), the ink amount comparator 33 transmits, to the corrected model data generator 34, the information on the comparison result that the total amount of the build material is greater than the total amount of the decorative ink.

Upon receiving, from the ink amount comparator 33, the information on the comparison result that the total amount of the build material is greater than the total amount of the decorative ink, the corrected model data generator 34 generates corrected model data, which is a corrected version of the model data (S14). Specifically, based on the model data acquired by the model data receiver 31, the corrected model data generator 34 generates corrected model data for, as illustrated in FIG. 9, forming both the core portion 15 and the outer shell portion 16 of the object body portion A from a mixed material including the build material and the decorative ink mixed together. That is, the corrected model data generator 34 generates corrected model data for forming the object body portion A from a mixed material including the build material and the decorative ink mixed together. Then, the corrected model data generator 34 transmits the generated corrected model data to the printing controller 35.

Based on the corrected model data, the printing controller 35 controls the recording unit 10 so as to form the core portion 15 and the outer shell portion 16 from a mixed material (S15). That is, in S15, the object body portion A is formed. Subsequently, based on the corrected model data, the printing controller 35 controls the recording unit 10 so as to form the coating portion B from a white ink in such a manner that the coating portion B covers the object body portion A (S16). Then, based on the corrected model data, the printing controller 35 controls the recording unit 10 so as to form the decorative portion C from the decorative ink in such a manner that the decorative portion C covers the coating portion B (S17).

In the case where, based on the result of calculation by the ink amount calculator 32, the ink amount comparator 33 compares the total amount of the build material calculated by the calculator 32 with the total amount of the decorative ink calculated by the calculator 32, and the comparison result is that the total amount of the build material is less than or equal to the total amount of the decorative ink (S13, No), the ink amount comparator 33 transmits, to the model data receiver 31, the information on the comparison result that the total amount of the build material is less than or equal to the total amount of the decorative ink. Upon receiving, from the ink amount comparator 33, the information on the comparison result that the total amount of the build material is less than or equal to the total amount of the decorative ink, the model data receiver 31 transmits the acquired model data as it is to the printing controller 35. Based on the model data, the printing controller 35 forms the object body portion A, the coating portion B, and the decorative portion C (S18).

Even when the core portion 15 and the outer shell portion 16 are together formed from a mixed material as described above, the amount of the build material used to form the object body portion A according to this embodiment is reduced and a greater amount of decorative ink is used, compared with the case in which the object body portion A is formed from build material. As a result, the decorative ink is consumed efficiently, and therefore the difference between the amount of build material used and the amount of decorative ink used is reduced.

In this embodiment, the object body portion A is formed from a mixed material. For this reason, in order to inhibit the color of the decorative ink forming the object body portion A from appearing in the outer layers of the three-dimensional object 5, it is preferable to form the coating portion B, which covers the object body portion A, from a white ink. This configuration ensures that the color of the decorative portion is adjusted by subtractive mixing.

(2) Method for Generating Corrected Model Data

For generation of the corrected model data, there are no particular limitations on the decorative ink to be included in the mixed material that forms the object body portion A, the amount of the decorative ink to be used, and other features. In the following, an example of a method for determining the features will be described. However, the present invention is not limited to the example.

(2-1 Determination of Amount of Decorative Ink to be Used)

For example, when receiving, from the ink amount comparator 33, information on the comparison result that the total amount of the build material is greater than the total amount of the decorative ink, the corrected model data generator 34 may determine, according to the difference, the amount of the decorative ink to be included in the mixed material to be used to form the core portion 15 and the outer shell portion 16. With this configuration, the amount of the decorative ink to be included in the mixed material to be used to form the core portion 15 and the outer shell portion 16 is determined according to the difference between the total amount of the build material and the total amount of the decorative ink. As a result, the difference between the amount of build material used and the amount of decorative ink used is reduced more accurately.

The corrected model data generator 34 determines the amount of the decorative ink to be included in the mixed material that forms the core portion 15 and the outer shell portion 16, according to the difference between the total amount of the build material and the total amount of the decorative ink, which are compared by the ink amount comparator 33. Then, the corrected model data generator 34 generates corrected model data including a core portion 15 and an outer shell portion 16 formed from the mixed material including the decorative ink in the amount determined to be the amount of the decorative ink to be included in the mixed material. Based on the corrected model data, the printing controller 35 controls the recording unit 10 so as to form the core portion 15 and the outer shell portion 16 from the mixed material including the decorative ink in the amount determined to be the amount of the decorative ink to be included in the mixed material. The amount is determined by the corrected model data generator 34.

(2-2 Determination of Decorative Ink)

The corrected model data generator 34 may determine the decorative ink(s) to be included in the mixed material to be used to form the core portion 15 and the outer shell portion 16, according to the total amount of the decorative ink, which is calculated by the ink amount calculator 32. For example, based on the total amount of the decorative ink calculated by the ink amount calculator 32, the corrected model data generator 34 may select the decorative ink that is used in the least amount or may select a plurality of decorative inks that are used in smaller amounts as the decorative ink to be included in the mixed material. Thus, the decorative ink to be included in the mixed material can be determined according to the total amount of the decorative ink calculated by the ink amount calculator 32. As a result, the difference between the amount of decorative ink used and the amount of build material used, on an individual decorative ink basis, is reduced more accurately.

The corrected model data generator 34 generates corrected model data including a core portion 15 and an outer shell portion 16 formed from the mixed material including the decorative ink determined to be the decorative ink to be included in the mixed material, in the amount determined to be the amount of the decorative ink to be used. Based on the corrected model data, the printing controller 35 controls the recording unit 10 so as to form the core portion 15 and the outer shell portion 16 from the mixed material including the decorative ink determined to be the decorative ink to be included in the mixed material, in the amount determined to be the amount of the decorative ink to be used.

In the case where a plurality of decorative inks are selected as the decorative ink to be included in the mixed material, the amount determined to be the amount of the decorative ink to be included in the mixed material may be distributed to the selected decorative inks. The amount of the decorative ink to be included in the mixed material may be distributed uniformly among the selected decorative inks or may be distributed according to the remaining quantities of the selected decorative inks.

Summarization

According to one aspect of the present invention, a method for manufacturing a three-dimensional object 5 is a method for manufacturing a three-dimensional object 5, which includes an object body portion A and a decorative portion C. The method includes forming the object body portion A from at least decorative ink and build material, and forming the decorative portion C from the decorative ink. The decorative portion C covers the object body portion.

In the method described above, the object body portion A, which is typically formed from build material, is formed from at least decorative ink and build material. That is, in the embodiment of the present invention, part of the object body portion can be formed from decorative ink, in place of build material, to form the object body portion A. In this manner, decorative ink, which tends to be used less frequently, is used in place of build material, which tends to be used more frequently, to form the object body portion. As a result, the difference between the amount of build material used and the amount of decorative ink used is reduced.

In the aspect of the present invention, the method for manufacturing a three-dimensional object 5 may be as follows. The forming of the object body portion may include forming a core portion 15 of the object body portion from at least the decorative ink and forming an outer shell portion 16 from at least the build material, the outer shell portion 16 constituting an outer shell of the core portion 15 and covering the core portion.

In the method described above, the outer shell portion 16 may be provided between the decorative portion C and the core portion 15. This configuration inhibits the color of the decorative ink forming the core portion 15 from affecting the decorative portion, which is adjacent to the outer layers of the three-dimensional object.

In the aspect of the present invention, the method for manufacturing a three-dimensional object 5 may be as follows. In the forming of the core portion, the core portion 15 may be formed from the decorative ink. In the forming of the outer shell portion, the outer shell portion 16 may be formed from the build material.

As in the method described above, the core portion 15 of the object body portion A may be formed from the decorative ink and the outer shell portion 16 of the object body portion A may be formed from the build material. When the build material is white, the outer shell portion 16, formed from a white ink, may be provided between the decorative portion C and the core portion 15. This configuration inhibits the color of the decorative ink forming the core portion 15 from appearing in the outer layers of the three-dimensional object 5 and ensures that the color of the decorative portion C is adjusted by subtractive mixing.

In the aspect of the present invention, the method for manufacturing a three-dimensional object 5 may be as follows. In the forming of the core portion, the core portion 15 may be formed from a mixed material including the build material and the decorative ink mixed together. In the forming of the outer shell portion, the outer shell portion 16 may be formed from the mixed material. The method may include forming a coating portion B from a white ink. The coating portion B covers the outer shell portion 16.

In the method described above, the core portion 15 and the outer shell portion 16 of the object body portion A may both be formed from a mixed material including the decorative ink and the build material mixed together. In this case, the coating portion B, which is formed from a white ink, may be provided between the decorative portion C and the outer shell portion 16. This configuration inhibits the color of the decorative ink forming the object body portion A from appearing in the outer layers of the three-dimensional object 5 and ensures that the color of the decorative portion C is adjusted by subtractive mixing.

In the aspect of the present invention, the method for manufacturing a three-dimensional object 5 may further include calculating and comparing. The calculating may calculate, based on three-dimensional data of the three-dimensional object 5, a total amount of the build material to be used in a case where the object body portion A of the three-dimensional object 5 is formed exclusively from the build material and a total amount of the decorative ink to be used in a case where the decorative portion of the three-dimensional object 5 is formed exclusively from the decorative ink. The comparing may compare the total amount of the build material calculated in the calculating with the total amount of the decorative ink calculated in the calculating. When a result of the comparing is that a difference between the total amount of the build material and the total amount of the decorative ink is greater than a predetermined amount, the forming of the object body portion and the forming of the decorative portion may be performed.

In the method described above, in the case where the difference between the total amount of the build material and the total amount of the decorative ink is greater than a predetermined amount, part of the object body portion A may be formed from the decorative ink in place of the build material, to form the object body portion A. That is, the three-dimensional data of the three-dimensional object 5 to be formed may be analyzed and then a determination may be made of whether to use the decorative ink in place of the build material to form part of the object body portion A. This configuration reduces more effectively the difference between the amount of build material used and the amount of decorative ink used.

In the aspect of the present invention, the method for manufacturing a three-dimensional object 5 may be as follows. The forming of the object body portion may include forming a core portion 15 of the object body portion from at least the decorative ink and forming an outer shell portion 16 from at least the build material, the outer shell portion 16 constituting an outer shell of the core portion 15 and covering the core portion 15. In the forming of the core portion, the core portion 15 may be formed from the decorative ink, and in the forming of the outer shell portion, the outer shell portion 16 may be formed from the build material. The method may further include determining regions including a region defining the core portion 15 and a region defining the outer shell portion 16. The determining may be performed when a result of the comparing is that the difference between the total amount of the build material and the total amount of the decorative ink is greater than a predetermined amount, and the determining may be according to the difference. In the forming of the core portion, the core portion 15 may be formed from the decorative ink according to the region determined in the determining of the regions, and in the forming of the outer shell portion, the outer shell portion 16 may be formed from the build material according to the region determined in the determining of the regions.

In the method described above, the regions defining the core portion 15 and the outer shell portion 16 may be determined according to the difference between the total amount of the build material and the total amount of the decorative ink. As a result, the difference between the amount of build material used and the amount of decorative ink used is reduced more accurately.

In the aspect of the present invention, the method for manufacturing a three-dimensional object 5 may further include determining a decorative ink to be used to form the core portion 15 and determining an amount of the decorative ink to be used determined in the determining of the decorative ink. The decorative ink may be determined according to the total amount of the decorative ink calculated in the calculating. The amount of the decorative ink may be determined according to the region defining the core portion 15 determined in the determining of the regions. In the forming of the core portion, the core portion 15 may be formed, according to the region determined in the determining of the regions, from the decorative ink determined in the determining of the decorative ink in the amount determined in the determining of the amount of the decorative ink to be used.

In the method described above, the decorative ink to be used to form the core portion 15 may be determined according to the total amount of the decorative ink. As a result, the difference between the amount of decorative ink used and the amount of build material used, on an individual decorative ink basis, is reduced more accurately.

In the aspect of the present invention, the method for manufacturing a three-dimensional object 5 may be as follows. The forming of the object body portion may include forming a core portion 15 of the object body portion from at least the decorative ink and forming an outer shell portion 16 from at least the build material, the outer shell portion 16 constituting an outer shell of the core portion 15 and covering the core portion 15. In the forming of the core portion, the core portion 15 may be formed from a mixed material including the build material and the decorative ink mixed together, and in the forming of the outer shell portion, the outer shell portion 16 may be formed from the mixed material. The method may further include forming a coating portion B from a white ink. The coating portion B covers the outer shell portion 16. The method may further include determining an amount of the decorative ink to be included in the mixed material to be used to form the core portion 15 and the outer shell portion 16. The determining may be performed when a result of the comparing is that the difference between the total amount of the build material and the total amount of the decorative ink is greater than a predetermined amount, and the determining may be according to the difference. In the forming of the core portion, the core portion 15 may be formed from the mixed material including the decorative ink in the amount determined in the determining of the amount of the decorative ink to be used, and in the forming of the outer shell portion, the outer shell portion 16 may be formed from the mixed material including the decorative ink in the amount determined in the determining of the amount of the decorative ink to be used.

In the method described above, the amount of the decorative ink to be included in the mixed material to be used to form the core portion 15 and the outer shell portion 16 may be determined according to the difference between the total amount of the build material and the total amount of the decorative ink. As a result, the difference between the amount of build material used and the amount of decorative ink used is reduced more accurately.

In the aspect of the present invention, the method for manufacturing a three-dimensional object 5 may be as follows. The method may further include determining, according to the total amount of the decorative ink calculated in the calculating, a decorative ink to be included in the mixed material. In the forming of the core portion, the core portion 15 may be formed from the mixed material including the decorative ink determined in the determining of the decorative ink in the amount determined in the determining of the amount of the decorative ink to be used. In the forming of the outer shell portion, the outer shell portion 16 may be formed from the mixed material including the decorative ink determined in the determining of the decorative ink in the amount determined in the determining of the amount of the decorative ink to be used.

In the method described above, the decorative ink to be included in the mixed material may be determined according to the total amount of the decorative ink. As a result, the difference between the amount of decorative ink used and the amount of build material used, on an individual decorative ink basis, is reduced more accurately.

In the aspect of the present invention, the method for manufacturing a three-dimensional object 5 may be as follows. The method may further include forming a coating portion B from a white ink. The coating portion B covers the object body portion A. In the forming of the decorative portion, the decorative portion C may be formed from the decorative ink. The decorative portion C covers the coating portion B.

In the method described above, the coating portion B, which is formed from a white ink, may be provided between the decorative portion C and the object body portion A. This configuration inhibits, in the case where the build material is transparent, for example, the color of the decorative ink forming the core portion 15 from appearing in the outer layers of the three-dimensional object 5, and ensures that the color of the decorative portion C is adjusted by subtractive mixing.

In the aspect of the present invention, the method for manufacturing a three-dimensional object 5 may be as follows. The forming of the object body portion may include forming a core portion 15 of the object body portion from at least the decorative ink and forming an outer shell portion 16 from at least the build material, the outer shell portion 16 constituting an outer shell of the core portion 15 and covering the core portion 15. In the forming of the outer shell portion, the outer shell portion 16 may be formed to have a thickness that prevents the color of the decorative ink forming the core portion 15 from appearing through the outer shell portion 16.

The method described above inhibits degradation of color quality of the decorative portion C, which may otherwise occur if the color of the decorative ink forming the core portion 15 appears through the coating portion B or the outer shell portion 16. As a result, the ink(s) selected for the decorative portion C achieves a desired color.

In the aspect of the present invention, the method for manufacturing a three-dimensional object 5 may be as follows. The forming of the object body portion may include forming a core portion 15 of the object body portion from at least the decorative ink and forming an outer shell portion 16 from at least the build material, the outer shell portion 16 constituting an outer shell of the core portion 15 and covering the core portion 15. A volume of the core portion 15 may be larger than a volume of the outer shell portion 16. The volume of the outer shell portion 16 may be larger than or equal to a volume of the decorative portion C.

In the method described above, the region (volume) of the core portion 15 may be larger than the region (volume) of the outer shell portion 16, and thus the amount of the ink used to form the core portion 15 may be greater than the amount of the ink used to form the outer shell portion 16. As a result, the amount of the decorative ink used in place of the build material increases, and thus the decorative ink is consumed more efficiently. Consequently, the difference between the amount of build material used and the amount of decorative ink used is reduced more effectively. Furthermore, when the outer shell portion 16 has a thickness greater than or equal to the thickness of the decorative portion, the thickness sufficiently inhibits the color of the decorative ink forming the core portion 15 from appearing in the outer layers of the three-dimensional object 5 through the outer shell portion 16.

In the aspect of the present invention, the method for manufacturing a three-dimensional object 5 may be as follows. The build material and the decorative ink may have the same cure shrinkage.

The method described above inhibits warping at the interfaces of the core portion 15 and the outer shell portion 16 after the build material and the decorative ink are cured.

In the aspect of the present invention, the method for manufacturing a three-dimensional object 5 may be as follows. The build material and the decorative ink may be extruded using ink-jet technology to manufacture the three-dimensional object 5.

The method according to the embodiment of the present invention for manufacturing the three-dimensional object 5 produces more effectively the effect of reducing the difference between the amount of build material used and the amount of decorative ink used when the three-dimensional object 5 is manufactured using ink-jet technology.

A manufacturing apparatus according to another aspect of the present invention is a manufacturing apparatus 60 for manufacturing a three-dimensional object 5, which includes an object body portion A and a decorative portion C. The manufacturing apparatus includes a printer (recording unit 10), a calculator (ink amount calculator 32), and a comparator (ink amount comparator 33). The printer is configured to form the three-dimensional object 5 from build material and decorative ink. The calculator is configured to calculate, based on three-dimensional data of the three-dimensional object 5, a total amount of the build material to be used in a case where the object body portion A of the three-dimensional object 5 is formed exclusively from the build material and a total amount of the decorative ink to be used in a case where the decorative portion C of the three-dimensional object 5 is formed exclusively from the decorative ink. The comparator is configured to compare the total amount of the build material calculated by the calculator with the total amount of the decorative ink calculated by the calculator. When a result of comparison by the comparator is that a difference between the total amount of the build material and the total amount of the decorative ink is greater than a predetermined amount, the printer is configured to form the object body portion A from at least the decorative ink and the build material, and is configured to form the decorative portion C from the decorative ink. The decorative portion C covers the object body portion.

With the configuration described above, the object body portion A can be formed from the decorative ink, which tends to be used less frequently, in place of the build material, which tends to be used more frequently. This configuration results in efficient consumption of the decorative ink and therefore reduces the difference between the amount of build material used and the amount of decorative ink used.

The present invention is not limited to the embodiments described above, and various changes may be made without departing from the scope of the claims. Embodiments obtained by appropriately combining techniques disclosed in different embodiments are also encompassed by the technical scope of the present invention.

INDUSTRIAL APPLICABILITY

The present invention can be utilized to manufacture three-dimensional objects.

The invention claimed is:

1. A method for manufacturing a three-dimensional object comprising an object body portion and a decorative portion by additive manufacturing, the method comprising:
    forming the object body portion from at least decorative ink and build material; and
    forming the decorative portion from the decorative ink, the decorative portion covering the object body portion,
    wherein the object body portion comprises a core portion in at least a part of an inner region of the object body portion, the core portion being formed by using the decorative ink,
    wherein the forming the object body portion comprises forming the core portion from at least the decorative ink,
    wherein the decorative ink includes a coloring ink and a transparent ink for forming the decorative portion,
    wherein the three-dimensional object further comprises a coating portion adjacent to an inner side of the decorative portion, and
    wherein the method further comprises forming the coating portion from a white ink.

2. The method according to claim 1, wherein the forming of the object body portion further comprises
    forming an outer shell portion from at least the build material, the outer shell portion constituting an outer shell of the core portion and covering the core portion.

3. The method according to claim 2, wherein, in the forming of the outer shell portion, the outer shell portion is formed from the build material.

4. The method according to claim 2, wherein, in the forming of the outer shell portion, the outer shell portion is formed from a mixed material comprising the build material and the decorative ink mixed together, and the coating portion covers the outer shell portion.

5. The method according to claim 1, further comprising:

calculating, based on three-dimensional data of the three-dimensional object, a total amount of the build material to be used in a case where the object body portion of the three-dimensional object is formed exclusively from the build material and a total amount of the decorative ink to be used in a case where the decorative portion of the three-dimensional object is formed exclusively from the decorative ink; and comparing the total amount of the build material calculated in the calculating with the total amount of the decorative ink calculated in the calculating, wherein, when a result of the comparing is that a difference between the total amount of the build material and the total amount of the decorative ink is greater than a predetermined amount, the forming of the object body portion and the forming of the decorative portion are performed.

6. The method according to claim 5, wherein the forming of the object body portion further comprises forming an outer shell portion from at least the build material, the outer shell portion constituting an outer shell of the core portion and covering the core portion, and wherein, in the forming of the core portion, the core portion is formed from the decorative ink, and in the forming of the outer shell portion, the outer shell portion is formed from the build material, the method further comprising determining regions comprising a region defining the core portion and a region defining the outer shell portion, the determining being performed when a result of the comparing is that the difference between the total amount of the build material and the total amount of the decorative ink is greater than the predetermined amount, the determining being according to the difference, wherein, in the forming of the core portion, the core portion is formed from the decorative ink according to the region determined in the determining of the regions, and in the forming of the outer shell portion, the outer shell portion is formed from the build material according to the region determined in the determining of the regions.

7. The method according to claim 6, further comprising:

determining, according to the total amount of the decorative ink calculated in the calculating, the decorative ink to be used to form the core portion; and determining, according to the region defining the core portion, an amount of the decorative ink to be used, the region being determined in the determining of the regions, the decorative ink being determined in the determining of the decorative ink, wherein, in the forming of the core portion, the core portion is formed, according to the region determined in the determining of the regions, from the decorative ink determined in the determining of the decorative ink in the amount determined in the determining of the amount of the decorative ink to be used.

8. The method according to claim 5, wherein the forming of the object body portion further comprises forming an outer shell portion from at least the build material, the outer shell portion constituting an outer shell of the core portion and covering the core portion, and wherein, in the forming of the core portion, the core portion is formed from a mixed material comprising the build material and the decorative ink mixed together, and in the forming of the outer shell portion, the outer shell portion is formed from the mixed material, wherein the coating portion covers the outer shell portion, the method further comprising:

determining an amount of the decorative ink to be included in the mixed material to be used to form the core portion and the outer shell portion, the determining being performed when a result of the comparing is that the difference between the total amount of the build material and the total amount of the decorative ink is greater than the predetermined amount, the determining being according to the difference, wherein, in the forming of the core portion, the core portion is formed from the mixed material comprising the decorative ink in the amount determined in the determining of the amount of the decorative ink to be used, and in the forming of the outer shell portion, the outer shell portion is formed from the mixed material comprising the decorative ink in the amount determined in the determining of the amount of the decorative ink to be used.

9. The method according to claim 8, further comprising determining, according to the total amount of the decorative ink calculated in the calculating, the decorative ink to be included in the mixed material, wherein, in the forming of the core portion, the core portion is formed from the mixed material comprising the decorative ink determined in the determining of the decorative ink in the amount determined in the determining of the amount of the decorative ink to be used, and in the forming of the outer shell portion, the outer shell portion is formed from the mixed material comprising the decorative ink determined in the determining of the decorative ink in the amount determined in the determining of the amount of the decorative ink to be used.

10. The method according to claim 2, wherein the coating portion covers the outer shell portion, wherein, in the forming of the decorative portion, the decorative portion is formed from the decorative ink, the decorative portion covering the coating portion.

11. The method according to claim 1, wherein the forming of the object body portion further comprises forming an outer shell portion from at least the build material, the outer shell portion constituting an outer shell of the core portion and covering the core portion, and wherein, in the forming of the outer shell portion, the outer shell portion is formed to have a thickness that prevents a color of the decorative ink forming the core portion from appearing through the outer shell portion.

12. The method according to claim 1, wherein the forming of the object body portion further comprises forming an outer shell portion from at least the build material, the outer shell portion constituting an outer shell of the core portion and covering the core portion, and wherein a volume of the core portion is larger than a volume of the outer shell portion, and the volume of the outer shell portion is larger than or equal to a volume of the decorative portion.

13. The method according to claim 1, wherein the build material and the decorative ink comprise a same cure shrinkage.

14. The method according to claim 1, wherein the build material and the decorative ink are extruded using ink-jet technology to manufacture the three-dimensional object.

\* \* \* \* \*